United States Patent
Hall et al.

(10) Patent No.: US 12,091,333 B2
(45) Date of Patent: Sep. 17, 2024

(54) METHOD AND APPARATUS FOR ELECTROCHEMICAL DEWATERING OF SUSPENSIONS OF CELLULOSIC NANOMATERIALS

(71) Applicant: Faraday Technology, Inc., Englewood, OH (US)

(72) Inventors: Timothy D. Hall, Englewood, OH (US); Maria E. Inman, Yellow Springs, OH (US); Stephen T. Snyder, Englewood, OH (US); Santosh H. Vijapur, Beavercreek, OH (US); E. Jennings Taylor, Bonita Springs, FL (US); Thi Xuan Huong Le, Dayton, OH (US)

(73) Assignee: Faraday Technology, Inc., Englewood, OH (US)

( * ) Notice: Subject to any disclaimer, the term of this patent is extended or adjusted under 35 U.S.C. 154(b) by 75 days.

(21) Appl. No.: 18/068,895

(22) Filed: Dec. 20, 2022

(65) Prior Publication Data
US 2023/0212041 A1    Jul. 6, 2023

Related U.S. Application Data

(62) Division of application No. 16/813,836, filed on Mar. 10, 2020, now abandoned.
(Continued)

(51) Int. Cl.
*C02F 1/461* (2023.01)
*C02F 1/469* (2023.01)
(Continued)

(52) U.S. Cl.
CPC .......... *C02F 1/46109* (2013.01); *C02F 1/469* (2013.01); *D21C 9/007* (2013.01);
(Continued)

(58) Field of Classification Search
None
See application file for complete search history.

(56) References Cited

U.S. PATENT DOCUMENTS 2,061,197 A   11/1936   Kiech
3,117,927 A   1/1964    Smith
(Continued)

FOREIGN PATENT DOCUMENTS

WO   2005033024 A1   4/2005
WO   2014072886 A1   5/2014
(Continued)

OTHER PUBLICATIONS

Wang et al., "Processing nanocellulose to bulk materials: a review," Cellulose (2019) 26:7585-7617 (Year: 2019).*
(Continued)

*Primary Examiner* — Krishnan S Menon
(74) *Attorney, Agent, or Firm* — Iandiorio Teska & Coleman, LLP

(57) ABSTRACT

A dewatering apparatus for cellulosic materials includes a chamber for an aqueous solution of a cellulosic material, an inner electrode in the chamber, an outer electrode in the chamber about the inner electrode, and a power supply connected to the inner electrode and the outer electrode applying a voltage potential across the electrodes to remove water associated with the aqueous solution and to dewater the cellulosic materials.

3 Claims, 17 Drawing Sheets

Related U.S. Application Data

(60) Provisional application No. 62/842,037, filed on May 2, 2019.

(51) Int. Cl.
*D21C 9/00* (2006.01)
*D21C 9/18* (2006.01)

(52) U.S. Cl.
CPC ...... *D21C 9/18* (2013.01); *C02F 2001/46157* (2013.01); *C02F 2201/46* (2013.01); *C02F 2201/46115* (2013.01); *C02F 2201/46175* (2013.01)

(56) References Cited

U.S. PATENT DOCUMENTS

| | | | |
|---|---|---|---|
| 3,757,426 A | 9/1973 | Candor et al. | |
| 4,331,525 A * | 5/1982 | Huba | A23C 9/144 210/651 |
| 4,671,874 A | 6/1987 | Fremont et al. | |
| 5,362,371 A * | 11/1994 | Candor | B30B 9/24 204/542 |
| 6,030,538 A | 2/2000 | Held | |
| 9,447,541 B2 | 9/2016 | Heiskanen et al. | |
| 2013/0112561 A1 | 5/2013 | Jajuee et al. | |
| 2017/0320018 A1 | 11/2017 | Orazem et al. | |

FOREIGN PATENT DOCUMENTS

| | | |
|---|---|---|
| WO | 2015068019 A1 | 5/2015 |
| WO | 2016057392 A1 | 4/2016 |
| WO | 2017037349 A1 | 3/2017 |

OTHER PUBLICATIONS

Supplementary European Search Report dated Jun. 1, 2023 for European Patent Application No. EP20798956.7, seven (7) pages.

* cited by examiner

CNC

CNF

ORIGINAL CNC      CONCENTRATED CNC, AFTER DILUTION AND REDISPERSION

ORIGINAL CNF      CONCENTRATED CNF, AFTER DILUTION AND REDISPERSION

METHOD AND APPARATUS FOR ELECTROCHEMICAL DEWATERING OF SUSPENSIONS OF CELLULOSIC NANOMATERIALS

RELATED APPLICATIONS

This application is a divisional application of U.S. patent application Ser. No. 16/813,836 filed Mar. 10, 2020 which claims benefit of and priority to U.S. Provisional Application Ser. No. 62/842,037 filed May 2, 2019, under 35 U.S.C. §§ 119, 120, 363, 365, and 37 C.F.R. § 1.55 and § 1.78, and which are incorporated herein by this reference.

GOVERNMENT RIGHTS

This invention was made with U.S. Government support under DOE Contract No. DE-SC0018787 awarded by Department of Energy. The Government may have certain rights in the subject invention.

FIELD OF THE INVENTION

This invention relates to an apparatus and method for dewatering of aqueous suspensions of cellulosic nanomaterials.

BACKGROUND OF THE INVENTION

Rapid urbanization and industrialization have led to an increase in global consumption of materials for various applications. Non-renewable resources such as petroleum products account for a significant fraction of global materials use. With increasing worldwide demand, an eventual depletion of non-renewable petroleum reserves is inevitable. There is large and important opportunity to investigate renewable resources to address long term sustainability. A cost-competitive biomass product would have substantial market potential in which to seek entry despite recent reductions in the price per barrel of crude oil. In the long-term, the non-renewable nature of petroleum reserves will eventually lead to upward pressure on the per-barrel price of petroleum crude. Accordingly, cellulosic materials are attracting considerable interest to replace in part traditional non-renewable resources.

Cellulosic nanomaterials including cellulosic nanocrystals (CNCs), cellulosic nanofibers (CNFs), microfibrilated cellulose (MFC), nanofibrilated cellulose (NFC), bacterial cellulose (BC) and the like exhibit unique properties including high strength-to-weight ratio, high absorbency, and the ability to self-assembly. In addition, cellulosic nanomaterials have significant environmental benefits because they are recyclable, biodegradable, and are produced from renewable resources. As described in U.S. Pat. No. 9,850,613 incorporated herein by reference, cellulosic nanomaterials are generally produced from native cellulose such as wood cellulose fibers, microbial sources, agricultural fibers and the like by three means, 1) acid hydrolysis resulting in nanocellulose of primarily crystalline structure, 2) mechanical methods resulting in nanocellulose with both crystalline and amorphous structures, and 3) bacterial synthesis. Cellulosic nanomaterials generally have at least one dimension in the range of 1 to 100 nm. Exemplary fabrication methods are disclosed in U.S. Pat. Nos. 4,483,743; 9,187,865; 9,322,133; 9,322,134; 9,399,840; 10,093,748; 10,214,595 and are incorporated herein by this reference.

Recently, the production of cellulosic nanomaterial has transitioned from laboratory to pilot scale, making their use in a variety of industrial applications feasible. Currently, cellulosic nanomaterials are produced as low concentration suspensions of solids in water. For example, CNCs and CNFs are available as aqueous suspensions of ~7 wt % solids and ~3 wt % solids, respectively. As shipping of low concentration suspensions of CNCs and CNFs over long distances is not economical, there is a need for energy-efficient, dewatering methods to increase the solids content. After dewatering, the suspensions generally should not exhibit agglomeration after the CNC or CNF suspensions are re-dispersed in water. As related to fiber particulates, agglomeration may be more specifically described as hornification where the fiber surfaces adhere to each other and form agglomerates as a result of drying. Hornification has been attributed to the formation of hydrogen bonds between the CNC and CNF fiber particulates and results in a loss of porosity and water uptake. Hornification is generally believed to occur at CNC and CNF solids content of ~20 to 30 wt %. The dewatering step may result in the final suspension concentration for a number of applications or the dewatering step may precede a subsequent drying step to further concentration the CNC or CNF suspensions. A key challenge to commercialization of cellulosic nanomaterials is the removal of water prior to use in a variety of applications.

Current methods of dewatering primarily consist of centrifugation, sedimentation and filtration. The remaining solids content after centrifugation are limited to ~8 wt % and the process is energy intensive and requires large capital investment. Furthermore, it is difficult to remove water from a suspension of CNCs or CNFs or mixtures thereof due to the dense web formed by the suspension which requires high pressures and long filtration times. WO2014096547A1 discloses a method for dewatering an aqueous slurry of microfibrillated cellulose using mechanical means followed by the use of water absorbing materials. WO2015068019A1 discloses a method for dewatering microfibrillated cellulose by subjecting the slurry to a first mechanical pressure followed by a second mechanical pressure. EP2815026A1 discloses a method for dewatering an aqueous fibril gel by first lowering the pH to reduce the water retention capacity followed by pressure filtration. WO2010019245A1 discloses a method for dewatering microcrystalline cellulose by using ionic liquids.

Drying methods include spray drying, freeze drying and supercritical drying. WO2014072886A1 discloses a method of drying using a simultaneous heating and mixing operation. However, it is not economical for removing the water content from suspension of <1 to 10 wt % solids. For example, based on the heat of evaporation of water (2260 kJ/kg), the energy required to dry a 2 wt % suspension of cellulosic nanomaterials is 110 MJ/kg. This is an economically prohibitively cost. Consequently, in applications where drying is required, a dewatering step may be economically incorporated prior to a drying step.

Electrochemically assisted filtering of aqueous particulate suspensions has previously been disclosed based on the principles of electo-flotation, electro-agglomeration, and electrocoagulation as described in U.S. Pat. Nos. 9,095,808 and 9,546,101 whose disclosures are incorporated by this reference.

U.S. Pat. No. 9,447,540 whose disclosure is incorporated by reference discloses a method for dewatering of a slurry of microfribrillated cellulose under the influence of an electric field to induce electroosmotic water flow away from the microfibrillated fibers in contrast to mechanical dewatering methods whereby the fibers themselves are moved. The best results were obtained with platinum electrodes.

A particular challenge with suspensions of cellulosic nanomaterials is that they are non-Newtonian fluids and exhibit pseudoplastic behavior. In addition, the current methods for dewatering require excessive amounts of energy and often result in significant agglomeration of the nanocellulose particles. Consequently, a need exists for an improved apparatus and method for dewatering suspensions of cellulose nanomaterials which requires relatively low energy and does not result in significant hornification.

BRIEF SUMMARY OF THE INVENTION

One aspect of a preferred embodiment of the invention is to provide a process and apparatus for dewatering aqueous suspensions of nanocellulosic materials. As noted in U.S. patent application 201900932288 there are generally three categories of cellulosic nanomaterials, 1) cellulosic nanocrystals (CNCs) produced from acid hydrolysis of cellulose material with a predominately crystalline structure, 2) cellulosic nanofibers (CNFs) produced by mechanical means from cellulose material with an amorphous and crystalline structure, 3) bacterial nanocellulose (BNCs) produced by various bacterial based processes. While not yet precisely defined, cellulosic nanomaterials including cellulosic nanocrystals (CNCs), cellulosic nanofibers (CNFs), microfibrilated cellulose (MFC), nanofibrilated cellulose NFC), bacterial cellulose (BC), bacterial nanocellulose (BNC) and the like and mixtures thereof are generally understood to be produced from cellulose material and have at least one dimension in the 1 to 100 nm range. While the properties of cellulosic nanomaterials vary based on their preparation method, their aqueous suspensions are generally non-Newtonian fluids exhibiting pseudoplastic behavior. Disclosed is an electrochemical apparatus and method for dewatering suspensions of non-Newtonian fluids exhibiting pseudoplastic behavior. Also disclosed is an electrochemical apparatus and method for dewatering of suspensions of cellulosic nanomaterials including cellulosic nanocrystals or cellulosic nanofibers or mixtures thereof. Also disclosed is an electrochemical apparatus and method for dewatering of suspensions of cellulosic nanocrystals (CNCs) of ~7 wt % solids in water to a final concentration of at least 15 wt % solids in water. Certain aspects further relate to an electrochemical apparatus and method for dewatering of suspensions of cellulosic nanofibers (CNFs) of ~3 wt % solids in water to a final concentration of at least 15 wt % solids in water. This invention further relates to an electrochemical apparatus and method for dewatering of suspensions of cellulosic nanomaterials to a final concentration of at least 20 wt % solids in water and an electrochemical apparatus and method for dewatering of suspensions of cellulosic nanomaterials to a final concentration of at least 25 wt % solids to 30 wt % solids in water. This invention further relates to electrochemical apparatus and method for dewatering of suspensions of cellulosic nanomaterials to a final concentration of at least 50 wt % solids to 70 wt % solids in water.

Certain aspects relate to an electrochemical method using direct current or constant voltage dewatering, an electrochemical method using pulsed current or pulsed voltage dewatering, and an electrochemical method using pulsed reverse current or pulsed reverse voltage dewatering. Certain aspects further relate to an electrochemical method using constant voltage dewatering with voltages in the approximate range of 20V to 180V and more preferably 100V to 150V. Certain aspects relate to an electrochemical method using pulsed current dewatering with duty cycles in the range of 25 to 75% and frequencies in the range of 1 to 100 Hertz. Certain aspects further relate to an electrochemical apparatus comprising concentric electrodes with at least one electrode rotating relative to the other electrode. Certain aspects further relate to an electrochemical apparatus with at least one electrode incorporating non-cylindrical shapes such as screw patterns or auger patterns or protruding paddles or protruding spines with said non-cylindrical shapes being either conducting or non-conducting. Certain aspects further relate to an electrochemical apparatus comprising concentric electrodes with at least one electrode rotating relative to the other electrode where the relative rotation rate varies during processing time to vary the viscosity of the pseudoplastic suspension as the solids concentration increases. Certain aspects further relate to an electrochemical apparatus comprising concentric electrodes with at least one electrode rotating relative to the other electrode where the relative rotation rate varies during processing time to maintain a constant viscosity of the pseudoplastic suspension as the solids concentration increases.

In one example, the problem of efficiently electrochemically dewatering a suspension of cellulose nanomaterials including cellulosic nanocrystals (CNCs), cellulosic nanofibers (CNFs), microfibrilated cellulose (MFC), nanofibrilated cellulose (NFC), bacterial cellulose (BC), bacterial nanocellulose (BNC) and the like or mixtures thereof exhibiting non-Newtonian pseudoplastic flow behavior using direct current or constant voltage electrolysis in an electrochemical cell plate and frame reactor with planar electrodes is solved by using constant voltage and more preferably pulse voltage and pulse reverse voltage electrolytic waveforms in conjunction with a cylindrical electrochemical cell including concentric electrodes comprising at least one electrode rotating relative to the second electrode and further comprising at least one electrode incorporating non-cylindrical shapes such as screw patterns or auger patterns or protruding paddles with said non-cylindrical shapes being electrically conducting or non-conducting.

Featured is a dewatering apparatus for cellulosic materials comprising a chamber for an aqueous solution of a cellulosic material, an inner electrode in the chamber, an outer electrode in the chamber about the inner electrode, and a power supply connected to the inner electrode and the outer electrode applying a voltage potential across the electrodes to remove water associated with the aqueous solution and to dewater the cellulosic materials.

The outer electrode may be a mesh electrode. The apparatus may further include means for rotating the inner electrode. The inner electrode may include protrusions (e.g., fins, paddles, dimples, and/or one or more blades). The paddles may include edge wipers.

In one example, the inner electrode is in the form of an auger with a helical screw blade and a hopper feeds the aqueous cellulosic material into the chamber. If the inner electrode includes paddles, they may include mesh and/or one or more orifices therethough. In one example, there is an intermediate electrode between the inner electrode and the outer electrode.

The apparatus may further include a separator about the outer electrode. The power supply may be configured to apply a pulse/pulse reverse waveform to the rod electrode and outer electrode. The apparatus may further include means for rotating the outer electrode.

Also featured is a dewatering method for cellulosic materials comprising placing an aqueous solution of a cellulosic material in a chamber with an inner electrode and outer electrode about the inner electrode, and applying a voltage potential across the electrodes to dewater the cellulosic material.

Also featured is a dewatering method for cellulosic material comprising applying an electric field to the cellulosic material in a chamber to dewater the cellulosic material, and simultaneously stressing the cellulosic material to lower its viscosity to further dewater the cellulosic material.

The chamber may include an inner electrode and an outer electrode and applying an electric field to the cellulosic material may include providing a power supply connected to the inner and outer electrodes. Stressing the cellulosic material preferably includes rotating the inner electrode and/or the outer electrode.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
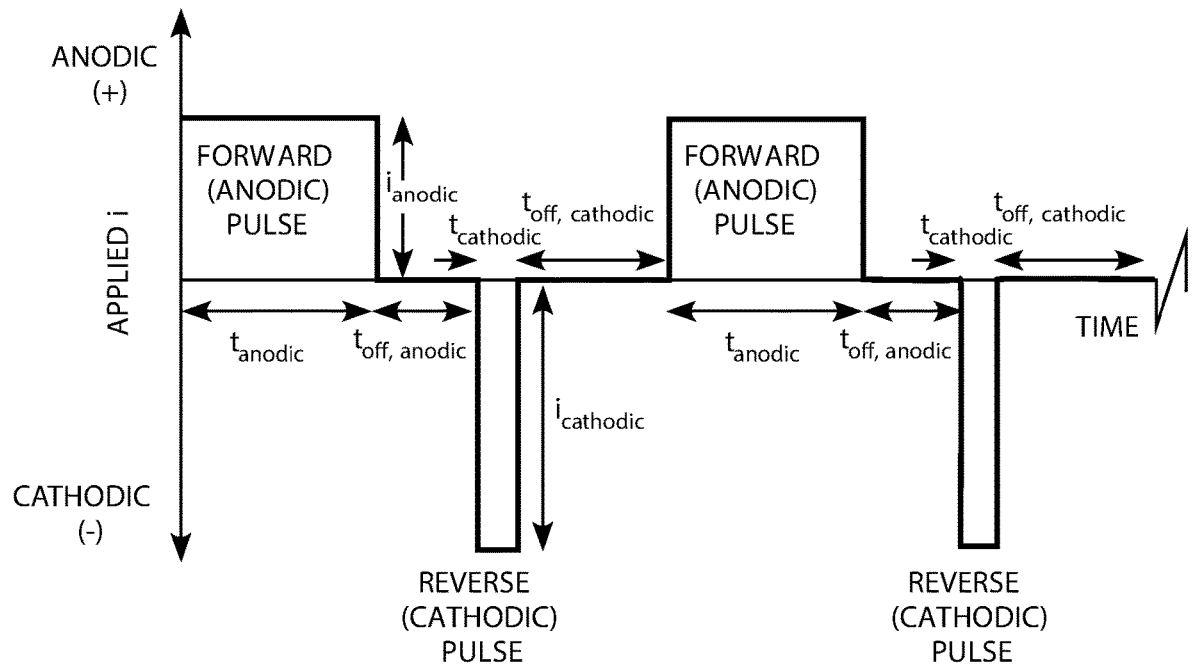
FIG. 1 is a schematic representation of a generalized pulse reverse waveform.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In one preferred embodiment, electrochemical dewatering a suspension includes removing water from the suspension and thus the solids content of the suspension is increased to a range of approximately 15 to 70 wt %. Drying the suspension includes removing water from the suspension and thus the dry content of the suspension is preferably increased to a range of approximately >90 wt % solids content. By cellulose nanocrystals (CNCs), we mean cellulose particles, regions, or crystals that contain nanometer-sized domains, or both micron-sized and nanometer-sized domains. Larger domains, including long fibers may be present in cellulose nanocrystals. By cellulose nanofibers (CNFs), we mean cellulose fibers or regions that contain nanometer-sized particles or fibers, or both micron-sized and nanometer-sized particles or fibers. Larger domains, including long fibers may be present in cellulose nanofibers. By micron-sized, we mean dimensions of 1 µm to 100 µm. By nanometer-sized, we mean dimensions of 0.01 nm to 1000 nm or 1 µm. By nanocellulosic suspension we mean nanocellulose particles including cellulosic nanocrystals (CNCs), cellulosic nanofibers (CNFs), microfibrilated cellulose (MFC), nanofibrilated cellulose (NFC), bacterial cellulose (BC), bacterial nanocellulose (BNC) and the like or mixtures thereof in an aqueous solution.

ElectroDewatering is an electrochemical technology that utilizes direct current or constant voltage, pulse current or pulse voltage, or pulse reverse current or pulse reverse voltage electric waveforms in conjunction with a cylindrical electrochemical cell for removal of water from an aqueous suspension of particulates such as cellulosic nanomaterials consisting of cellulosic nanocrystals (CNCs) of cellulosic nanofibers (CNFs) or mixtures thereof. While the instant invention is not bound by theory, this low-energy ElectroDewatering process may remove water by one or more mechanisms comprising Joule heating removal as water vapor, electrolysis removal as hydrogen and oxygen gas, electroosmotic transport of water to the cathode and electrophoretic transport of nanocellulosic material to the anode with subsequent removal of the liquid water from the cathode region, and/or creating regions of high nanocellulosic material content and low nanocellulosic material content due to the relative rotation of the anode and cathode with subsequent removal of liquid water from the low concentration nanocellulosic material region.

Joule heating, ohmic or resistive heating occurs when a high current is passed through a resistor, which creates interactions between charge carriers (usually electrons) and the body of the conductor and leads to an increase in temperature. More specifically, heating is generated rapidly and uniformly when applying a voltage across the nanocellulosic suspension due to the low conductivity of the nanocellulosic suspension. In some examples provide herein, the temperature of the cellulosic nanomaterials rapidly increases to ~80-90° C. (lower than the boiling point of water thus preventing structural damage of the nanocellulose). At these temperatures, the water is drawn from the cellulosic nanomaterials into as a water vapor thereby concentrating the nanocellulosic suspension.

The nanocellulosic suspension may also be concentrated by the electrolysis of water via the following well know half-cell electrochemical reactions with positively charged protons, Anode (proton)—$2H_2O \rightarrow O_2 + 4H^+ + 4e^-$
Cathode (proton)—$4H^+ + 4e^- \rightarrow 2H_2$
Net (proton)—$2H_2O \rightarrow O_2 + 2H_2$ And with negatively charged hydroxyl ions, Anode (hydroxyl)—$4OH^- \rightarrow O_2 + 2H_2O + 4e^-$
Cathode (hydroxyl)—$4H_2O + 4e^- \rightarrow 2H_2 + 4OH^-$
Net (hydroxyl)—$2H_2O \rightarrow O_2 + 2H_2$ With either the proton or hydroxyl ion the net reaction is the consumption of water and generation of hydrogen and oxygen gas.

Electroosmotic transport of water under the influence of an electric field towards the cathode is well known in the art and has been discussed in the context of dewatering of cellulose nanocrystals (J. Wetterling, K. Sahlin, T. Mattsson, G. Westman, H. Theliander "Electroosmotic dewatering of cellulose nanocrystals *Cellulose* (2018) 25:2321 to 2329).

Nanocellulosic materials in a water suspension are reported to exhibit a negative surface charge (T. Navab-Daneshmand, R. Beton, R. Hill, D. Frigon "Impact of Joule Heating and pH on Biosolids Electro-dewatering" *Environ. Sci. Technol.* 15 Dec. 2014). Electrophoretic transport of nanocellulosic materials under the influence of an electric field towards the positively charged anode is a possible mechanism for creating regions of high and low concentrations of nanocellulosic suspensions.

Due to the pseudoplastic behavior of the nanocellulosic suspensions, the relative rotation of the electrodes in the rotating cylindrical electrode apparatus may induce changes in the viscosity of the nanocellulosic suspensions to generate region of low and high concentration of nanocellulosic material.

Any or all of the above mechanisms of water removal and transport may be combined into an electrochemical dewatering method and apparatus for low energy concentration of particle suspensions in water such as nanocellulosic suspensions.

Direct current or constant voltage electric fields may be used for effective electrodewatering of nanocellulsoic suspensions at low energy consumption. Furthermore, pulse current or pulse voltage, or pulse reverse current or pulse reverse voltage may be used for effective electrodewatering of nanocellulsoic suspensions at low energy consumption. Pulse current or pulse voltage, or pulse reverse current or pulse reverse voltage waveforms are interrupted, asymmetric waveforms characterized by an anodic or cathodic period and optionally followed by an off time and optionally followed by a cathodic or anodic period and optionally followed by an off time as shown in FIG. 1. These waveforms may be continued during the electrolytic process. The preferred waveform parameters are: (1) the anodic pulse current density, $i_{anodic}$, (2) the anodic on-time, $t_{anodic}$, (3) the anodic off-time, $t_{off,\ anodic}$ (4) the cathodic pulse current density, $i_{cathodic}$, (5) the cathodic on-time, $t_{cathodic}$, and (6) the cathodic off-time, $t_{off,\ cathodic}$. In some embodiments all of these parameters are used to generate the appropriate electrodewatering waveform. In other embodiments, one or more of the off-time parameters may be absent. In still other embodiments the waveform parameters may consist of only anodic or cathodic pulses. One of skill in the art realizes that applying a pulse waveform to one electrode in an electrochemical cell automatically applies a waveform of opposite polarity to the other electrode in the electrochemical cell. By convention, the electrode which experiences the net anodic waveform is designated the anode and the electrode which experiences the net cathodic waveform is designated the cathode. The sum of the cathodic and anodic on-times and the off times is the period, T, of the waveform. The inverse of the period is the frequency, f, of the waveform. The cathodic, $\lambda_c$, and anodic, $\lambda_a$, duty cycles are the ratios of their respective on-times to the waveform period. The average current density ($i_{avg}$) is given by:

$$i_{avg} = i_c \lambda_c - i_a \lambda_a \quad (1)$$

In pulse/pulse reverse process there are numerous combinations of peak current densities, duty cycles, and frequencies to obtain a given average current. These parameters provide the potential for much greater process control compared to direct current (DC).

Figure 2:
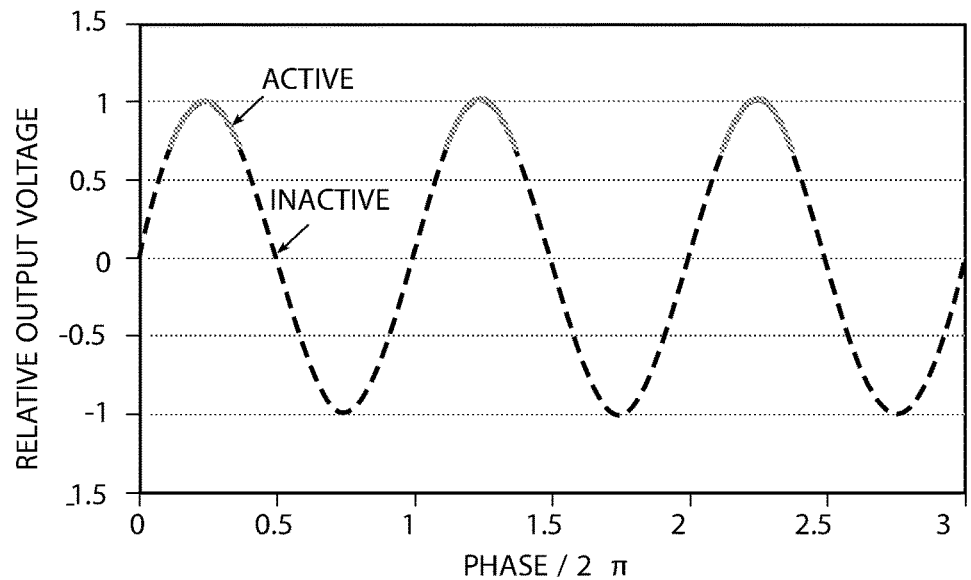
FIG. 2 is a schematic representation of a generalized chopped AC waveform.

With improvements in the output, control and accuracy of available pulse/pulse reverse power supplies, pulse/pulse reverse electrolytic processes have become more prevalent. In an ultimate production-scale device, a "chopped AC" waveform, schematically shown in FIG. 2, could be obtained by passing AC current through a properly tuned passive circuit comprising diodes, transformers, resistors, and other circuitry. In FIG. 2, the "active" region represents the voltage output delivered to the electrochemical cell while the "inactive" region represents the chopped part of the AC waveform which is not delivered to the cell. These chopped AC waveforms are potentially suitable for the proposed technology and afford superior power efficiency and highly favorable capital cost as compared to a fully functional, programmable pulse power supply.

Figure 3A:
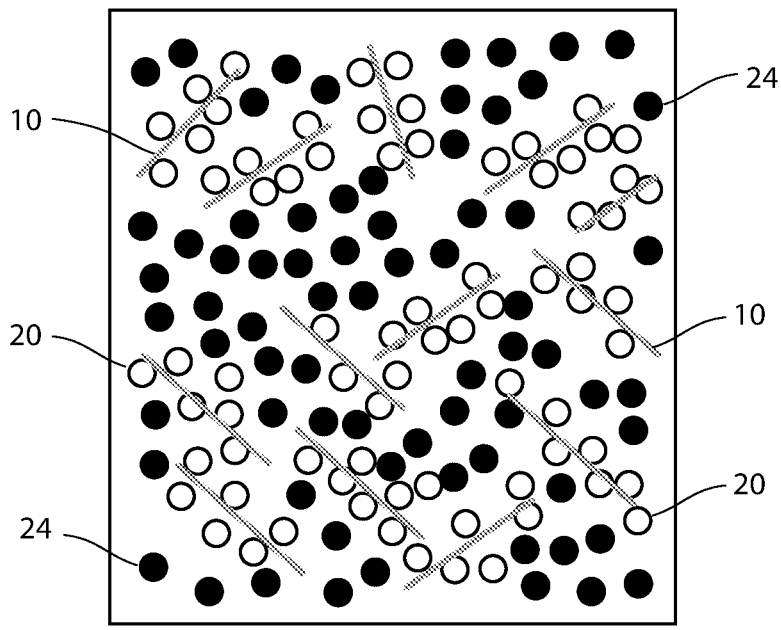
FIGS. 3A and 3B schematically illustrate suspensions of CNCs with (a) low and (b) high solids content.
Figure 3B:
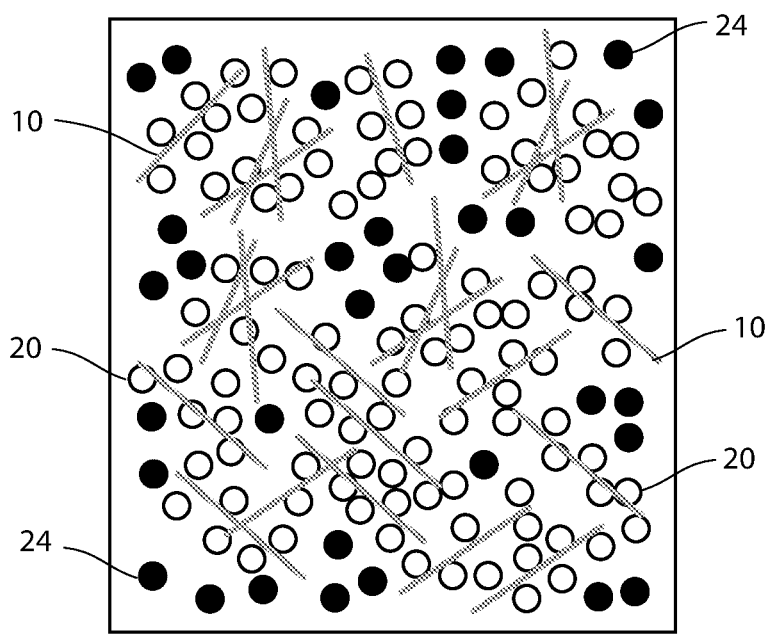
Figure 4A:
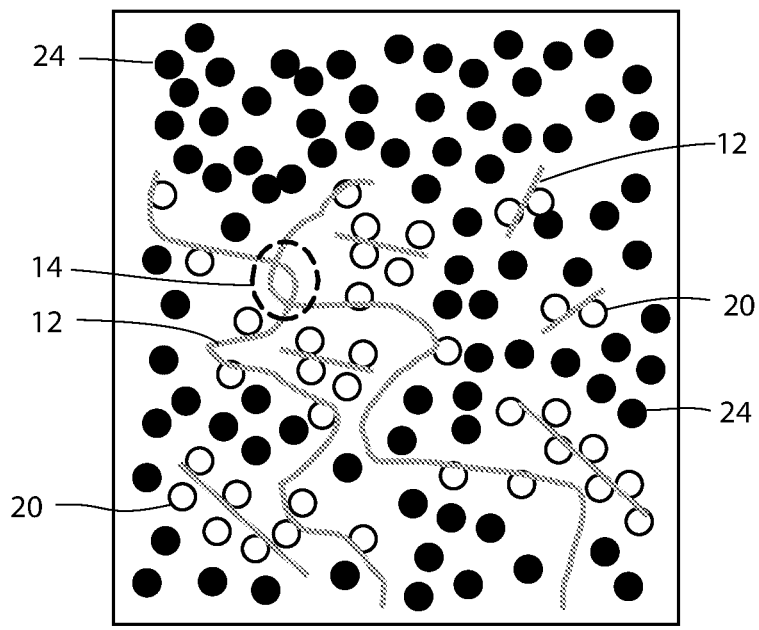
FIGS. 4A and 4B schematically illustrate suspensions of CNFs with (a) low and (b) high solids content.
Figure 4B:
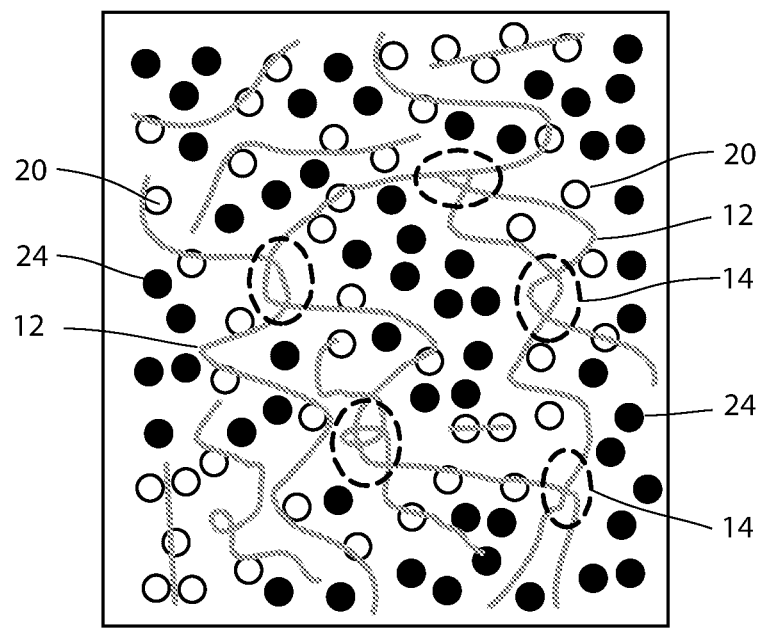

Suspensions of cellulosic nanomaterials are non-Newtonian fluids including CNCs or CNFs, free water, and immobilized water bound to the CNCs or CNFs by hydrogen bonds. (see generally Li et. Al. "Cellulose Nanoparticles: Structure-Rheology Relationships" *ACS Sustainable Chem. Eng.* 3, 821-832 (2015)) In FIG. 3 we schematically illustrate low (FIG. 3A) and high (FIG. 3B) concentration suspensions of CNCs 10. The suspensions include CNCs 10 as well as immobilized water 20 bound to the CNCs 10 and free water 24 not bound to the CNCs 10. In FIG. 4, we schematically illustrate low (FIG. 4A) and high (FIG. 4B) concentration suspensions of CNFs 12. The suspensions include CNFs 12 as well as immobilized water 20 bound to the CNCs 10 and free water 24 not bound to the CNCs 10. In addition, due to the high aspect ratio of CNFs 12, these suspensions include regions of CNFs 12 entangled with other CNFs 12. The unique structure of aqueous suspensions results in a non-Newtonian pseudoplastic behavior.

Figure 5:
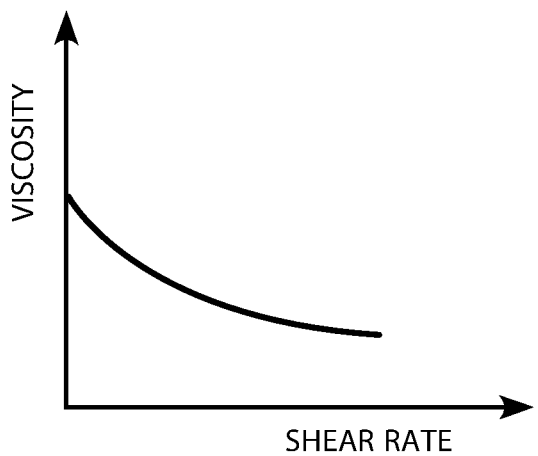
FIG. 5 schematically illustrates the change in viscosity of a non-Newtonian pseudoplastic fluid as a function of shear rate.

As illustrated in FIG. 5, the application of force such as a shear stress from a rotating spindle causes a change in the viscosity of the suspension wherein the viscosity is inversely related to the applied force. The nanocellulosic suspensions are non-Newtonian fluids and exhibit pseudo plastic behavior as depicted in FIG. 5. Consequently, when exposed to a shear stress, such as a turning cylinder (with or without paddles) their viscosity decreases. The applied force could be a shear rate caused by the relative rotation of the electrodes in a rotating cylindrical electrode apparatus. The addition of protrusions or paddles attached to one or more of the electrodes creates additional force resulting in additional shear rate motion.

Figure 6:
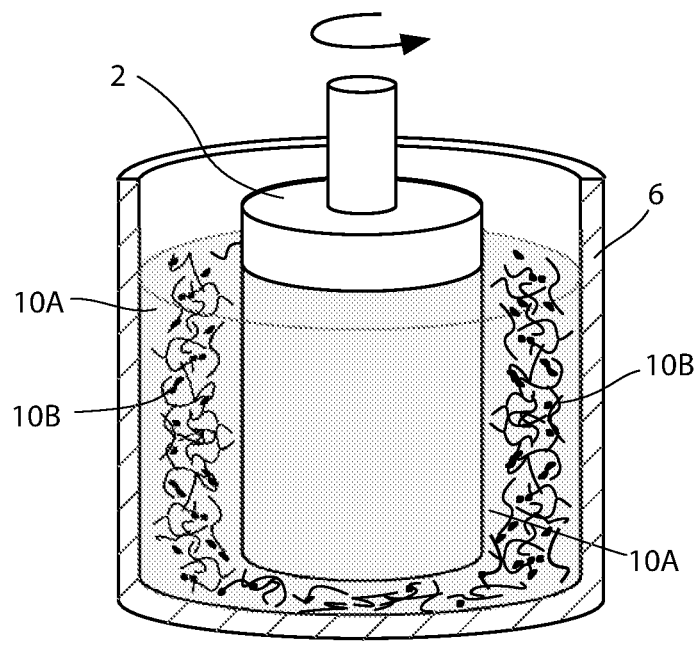
FIG. 6 schematically illustrates wall slip resulting in regions of higher and lower concentrations of nanocellulosic materials subjected to a rotating cylinder.

FIG. 6 schematically illustrates the wall slip effect during laminar shear flow generated by the relative rotation of smooth walled cylinders. (see generally Hubbe et. al. "Nanocellulose rheology" *BioResources* 12(4) 9556-9661 (2017)) In FIG. 6 an inner cylinder 2 is rotating within an outer cylinder 6. Contained within the inner cylinder 2 and outer cylinder 6 is a suspension of nanocellulosic materials. While FIG. 6 illustrates rotation of inner cylinder 2 while the outer cylinder 6 is stationary, one skilled in the art recognizes that the outer cylinder 6 could be rotating while the inner cylinder 2 is stationary or both the inner cylinder 2 and the outer cylinder 6 could be rotating. One feature of the illustration in FIG. 6 is the relative rotation of the inner cylinder 2 and the outer cylinder 6. This relative rotation of the inner cylinder 2 and the outer cylinder 6 leads to wall slip resulting in regions of low nanocellulosic material concentration 10a and regions of high nanocellulosic material concentration 10b. This non-Newtonian characteristic of nanocellulosic suspensions may be used to enhance the separation of water from nanocellulosic suspensions.

Figure 7:
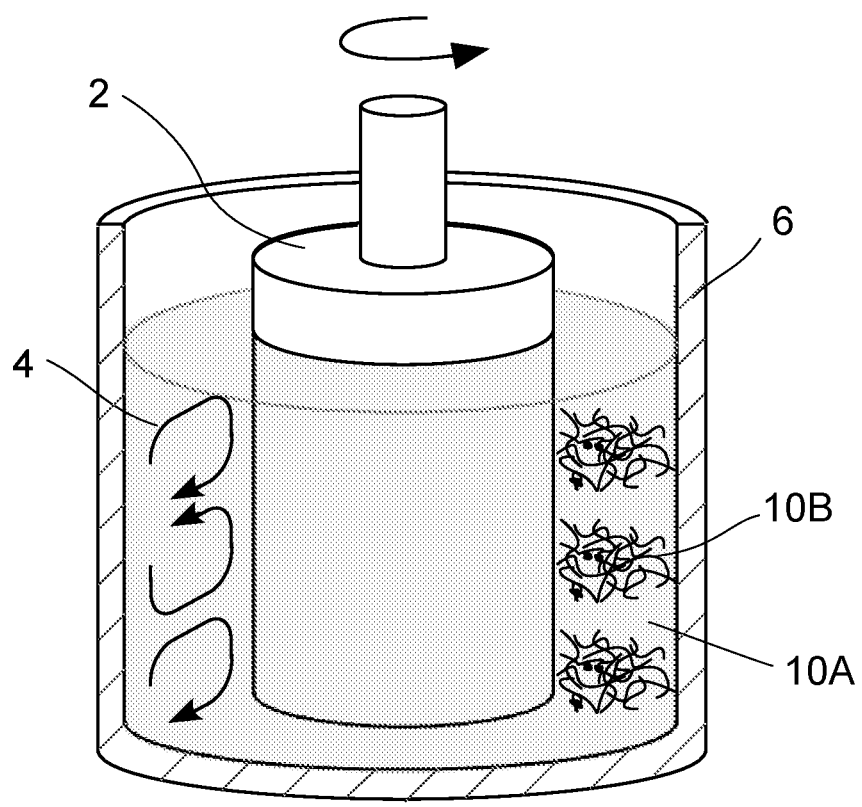
FIG. 7 schematically illustrates shear banding resulting in regions of higher and lower concentrations of nanocellulosic materials subjected to a rotating cylinder.

FIG. 7 schematically illustrates the shear banding effect generated by high relative rotation of smooth walled cylinders. At high relative rotation the laminar flow is disrupted. In FIG. 7 an inner cylinder 2 is rotating within an outer cylinder 6. Contained within the inner cylinder 2 and outer cylinder 6 is a suspension of nanocellulosic materials. While FIG. 7 illustrates rotation of inner cylinder 2 while the outer cylinder 6 is stationary, one skilled in the art recognizes that the outer cylinder 6 could be rotating while the inner cylinder 2 is stationary or both the inner cylinder 2 and the outer cylinder 6 could be rotating. One feature of the illustration in FIG. 7 is the high relative rotation of the inner cylinder 2 and the outer cylinder 6. This high relative rotation of the inner cylinder 2 and the outer cylinder 6 leads to Taylor vortices 4. These Taylor vortices 4 disrupt the laminar flow which occurs at low relative rotation resulting in bands of regions of low nanocellulosic material concentration 10a and regions of high nanocellulosic material concentration 10b. This non-Newtonian characteristic of nanocellulosic suspensions may be used to enhance the separation of water from nanocellulosic suspensions.

Figure 8A:
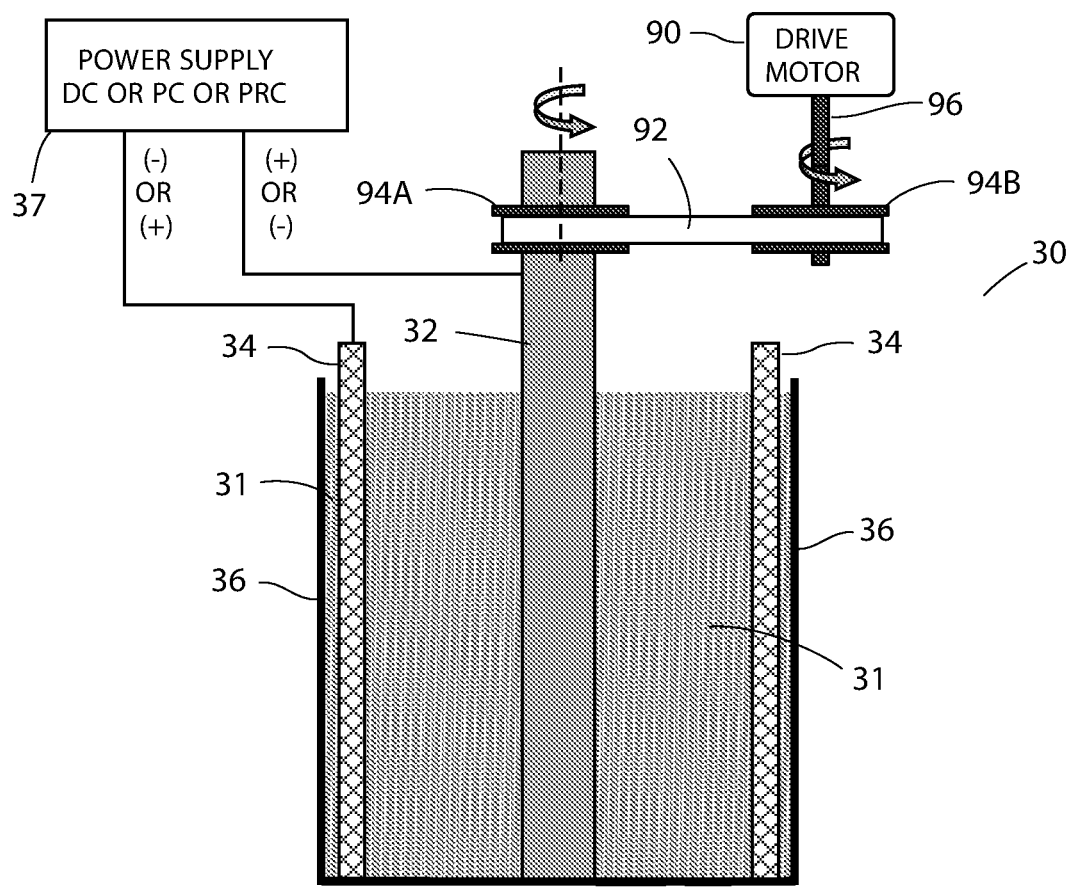
FIGS. 8A and 8B schematically illustrate a cylindrical electrochemical cell with a nanocellulosic suspension with a solid rod electrode and a concentric mesh electrode.
Figure 8B:
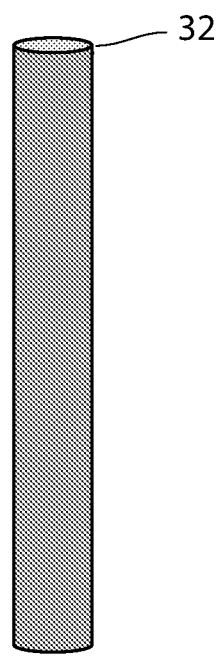

FIG. 8A schematically illustrates a cylindrical electrochemical cell 30 with a cylindrical solid rod inner electrode 32 and a concentric mesh outer electrode 34 within container 36. Power supply 37 is connected to inner electrode 32 and outer electrode 34 to provide electric current or voltage across the electrochemical cell 30 containing the nanocellulosic suspension 31. The electrochemical cell 30 is equipped with a rotating mechanism to apply rotation to inner electrode 32. The inner electrode 32 may be rotated at a fixed or variable rotation rate by drive motor 90 and rotating shaft 96 via belt 92 and pulley 94a and pulley 94b. By rotating electrode 32 (and/or electrode 34), the viscosity of the material near the rotating electrode(s) decreases and the resulting mater migrates (e.g., by electromigration) through electrode 34 and into chamber 36. FIG. 8B depicts the solid inner rod electrode 32.

Figure 9A:
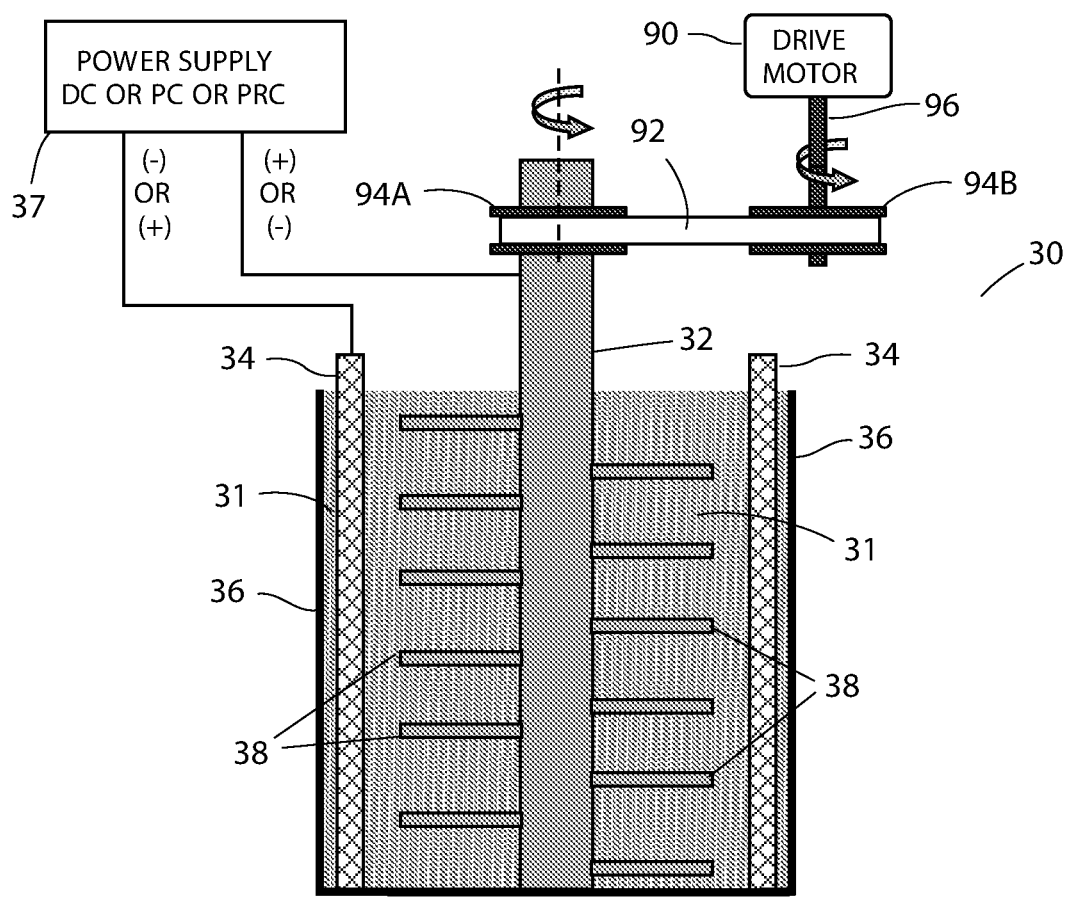
FIGS. 9A and 9B schematically illustrate a cylindrical electrochemical cell with a nanocellulosic suspension with a solid rod electrode with protruding spines and a concentric mesh electrode.
Figure 9B:
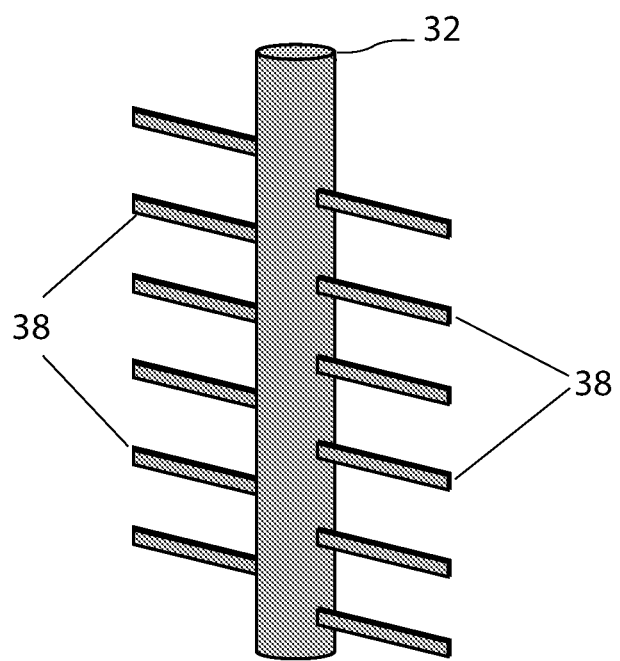

FIG. 9A schematically illustrates a cylindrical electrochemical cell 30 with a cylindrical solid rod inner electrode 32 with mixing protusions 38 to apply additional shear forces to the nanocellulosic suspension 31 and a concentric mesh outer electrode 34 within container 36. Power supply 37 is connected to inner electrode 32 and mesh outer electrode 34 to provide electric current or voltage across the electrochemical cell 30 containing the nanocellulosic suspension 31. The electrochemical cell 30 preferably is equipped with a rotating mechanism to apply rotation to inner electrode 32. The inner electrode 32 may be rotated at a fixed or variable rotation rate by drive motor 90 and rotating shaft 96 via belt 92 and pulley 94a and pulley 94b. FIG. 9B depicts inner electrode 32 with mixing protrusions 38.

Figure 10A:
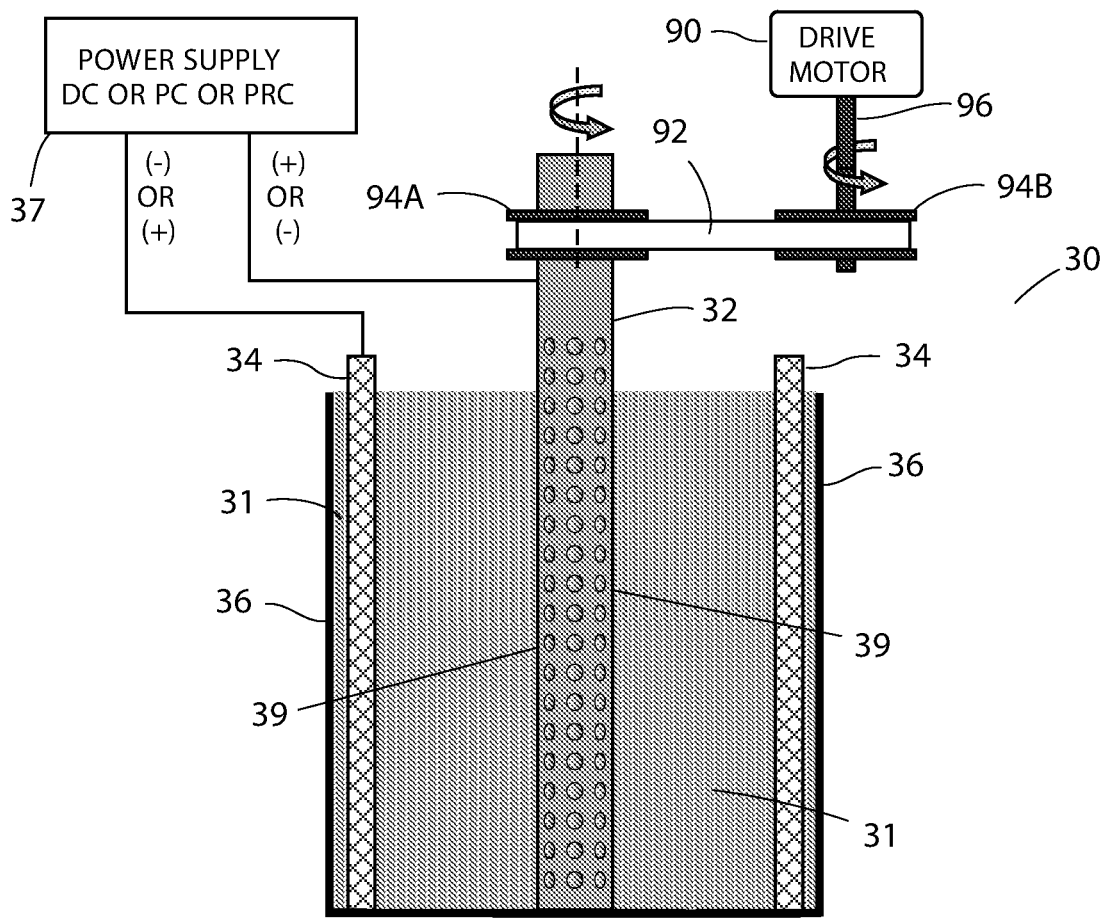
FIGS. 10A and 10B schematically illustrate a cylindrical electrochemical cell with a nanocellulosic suspension with a solid rod electrode with dimples and a concentric mesh electrode.
Figure 10B:
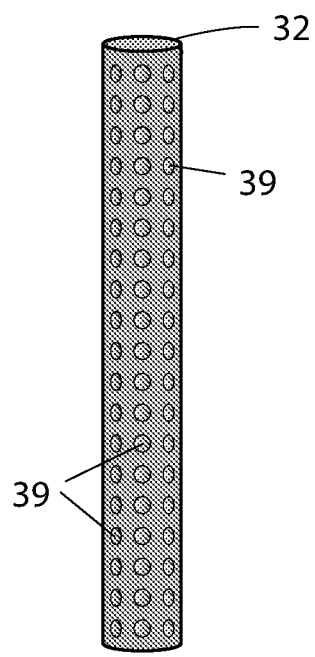

In FIG. 10A, schematically illustrates a cylindrical electrochemical cell 30 with a cylindrical solid rod inner electrode 32 with dimples 39 to minimize wall slip forces to the nanocellulosic suspension 31 and a concentric mesh outer electrode 34 within container 36. Power supply 37 is connected to inner electrode 32 and mesh outer electrode 34 to provide electric current or voltage across the electrochemical cell 30 containing the nanocellulosic suspension 31. The electrochemical cell 30 is equipped with a rotating mechanism to apply rotation to inner electrode 32. The inner electrode 32 may be rotated at a fixed or variable rotation rate by drive motor 90 and rotating shaft 96 via belt 92 and pulley 94a and pulley 94b. FIG. 10B depicts inner electrode 32 with dimples 39. Of course, one skilled in the art would recognize that equivalent features other than dimples 39 may be employed to eliminate the will slip effect at the inner electrode 32.

Figure 11A:
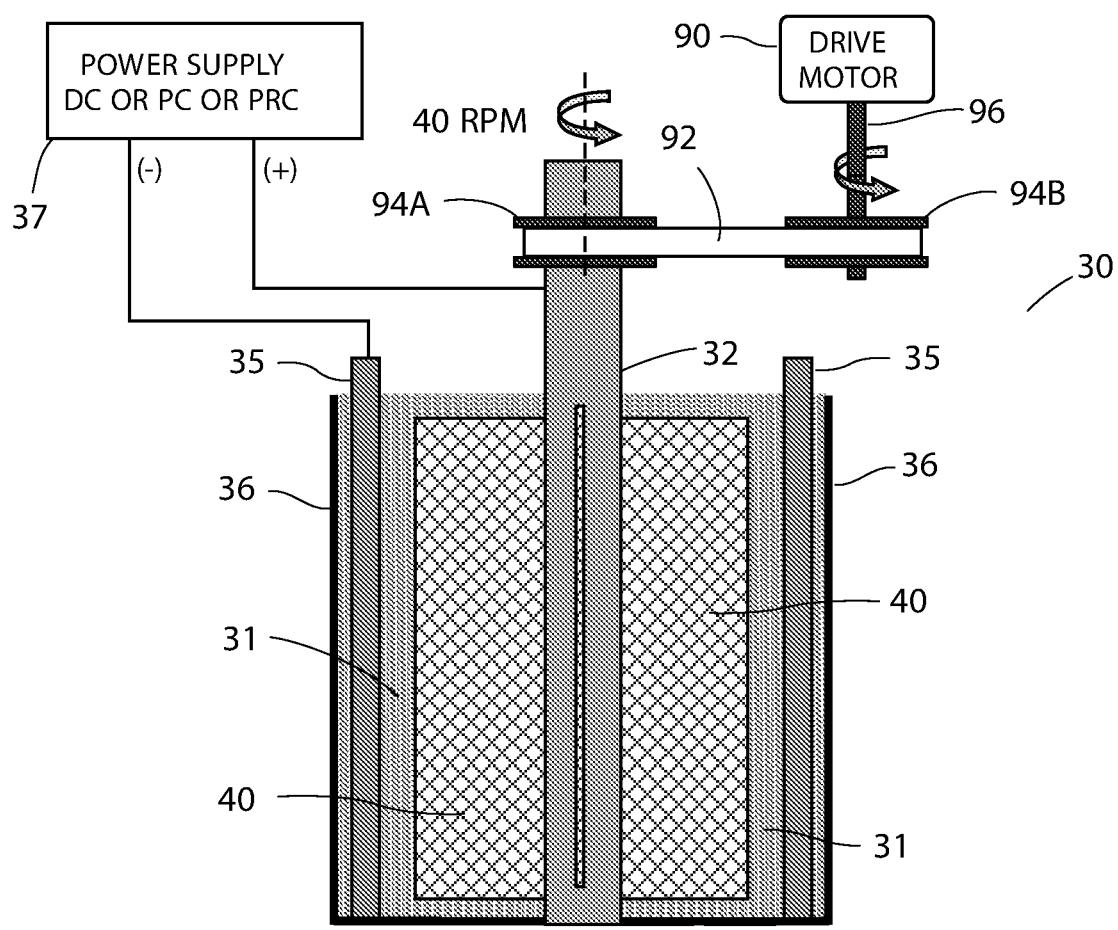
FIGS. 11A and 11B schematically illustrate a cylindrical electrochemical cell with a nanocellulosic suspension with a solid rod electrode with mesh paddles and a concentric solid electrode.
Figure 11B:
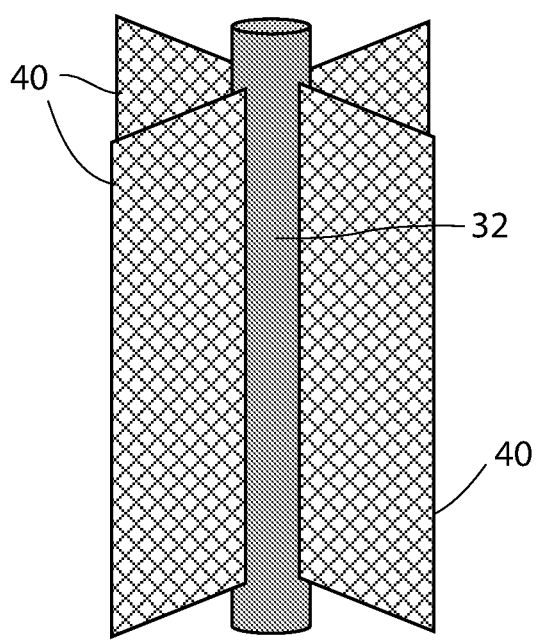

FIG. 11A schematically illustrates a cylindrical electrochemical cell 30 with a solid rod inner electrode 32 with mesh paddles 40 and a concentric solid outer electrode 35 within container 36. The addition of mesh paddles 40 to the rotating inner electrode 32 results in additional shear forces to the nanocellulosic material resulting in a higher water content near the surface of the mesh paddles 40 which may facilitate water removal from the nanocellulosic suspension 31. Power supply 37 is connected to inner electrode 32 and solid outer electrode 35 to provide electric current or voltage across the electrochemical cell 30 containing the nanocellulosic suspension 31. The electrochemical cell 30 is equipped with a rotating mechanism to apply rotation to inner electrode 32. The inner electrode 32 may be rotated at a fixed or variable rotation rate by drive motor 90 and rotating shaft 96 via belt 92 and pulley 94a and pulley 94b. FIG. 11B depicts inner electrode 32 with mesh paddles 40.

Figure 12A:
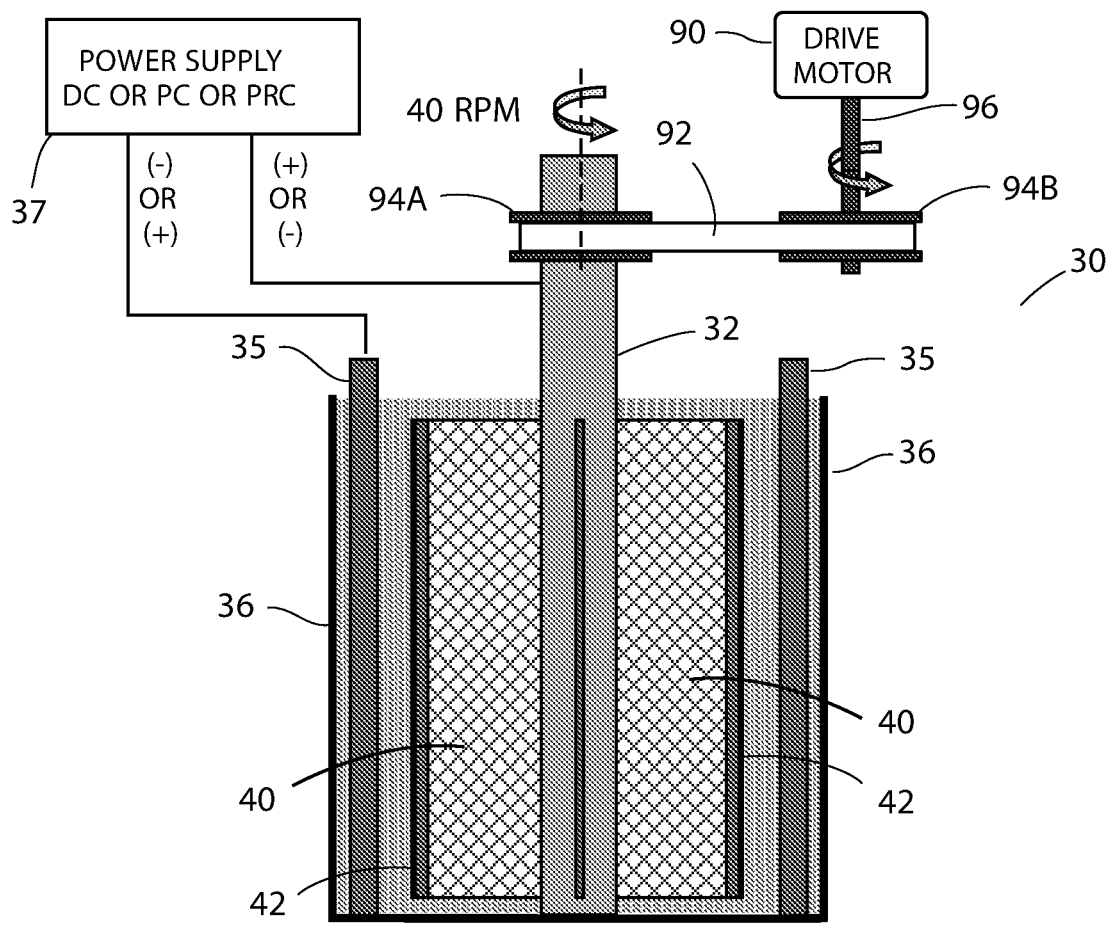
FIGS. 12A and 12B schematically illustrate a cylindrical electrochemical cell with a nanocellulosic suspension with a solid rod electrode with mesh paddles with insulating wipers and a concentric solid electrode.
Figure 12B:
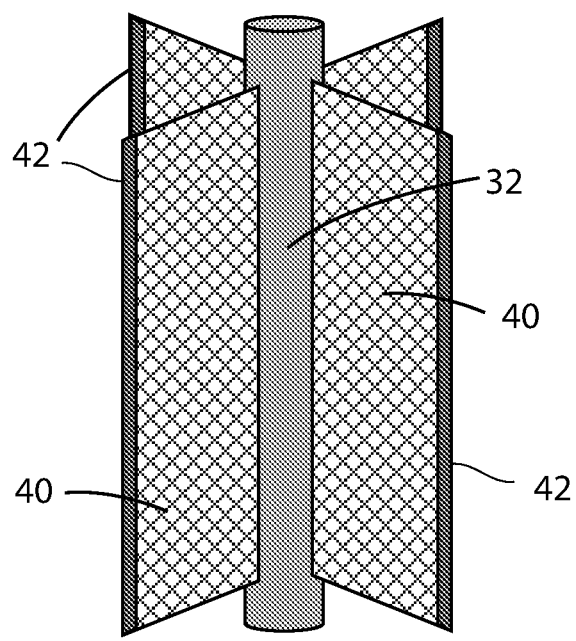

FIG. 12A schematically illustrates a cylindrical electrochemical cell 30 with a solid rod innerelectrode 32 with mesh paddles 40 with insulating wipers 42 and a concentric solid outer electrode 35. The insulating wipers 42 provide a mechanical means for removing nanocellulosic suspension from the outer electrode 35 to prevent obstruction of the water movement. Power supply 37 is connected to inner electrode 32 and solid outer electrode 35 to provide electric current or voltage across the electrochemical cell 30 containing the nanocellulosic suspension 31. The electrochemical cell 30 is equipped with a rotating mechanism to apply rotation to inner electrode 32. The inner electrode 32 may be rotated at a fixed or variable rotation rate by drive motor 90 and rotating shaft 96 via belt 92 and pulley 94a and pulley 94b. FIG. 12B depicts inner electrode 32 with mesh paddles 40 with insulating wipers 42.

Figure 13A:
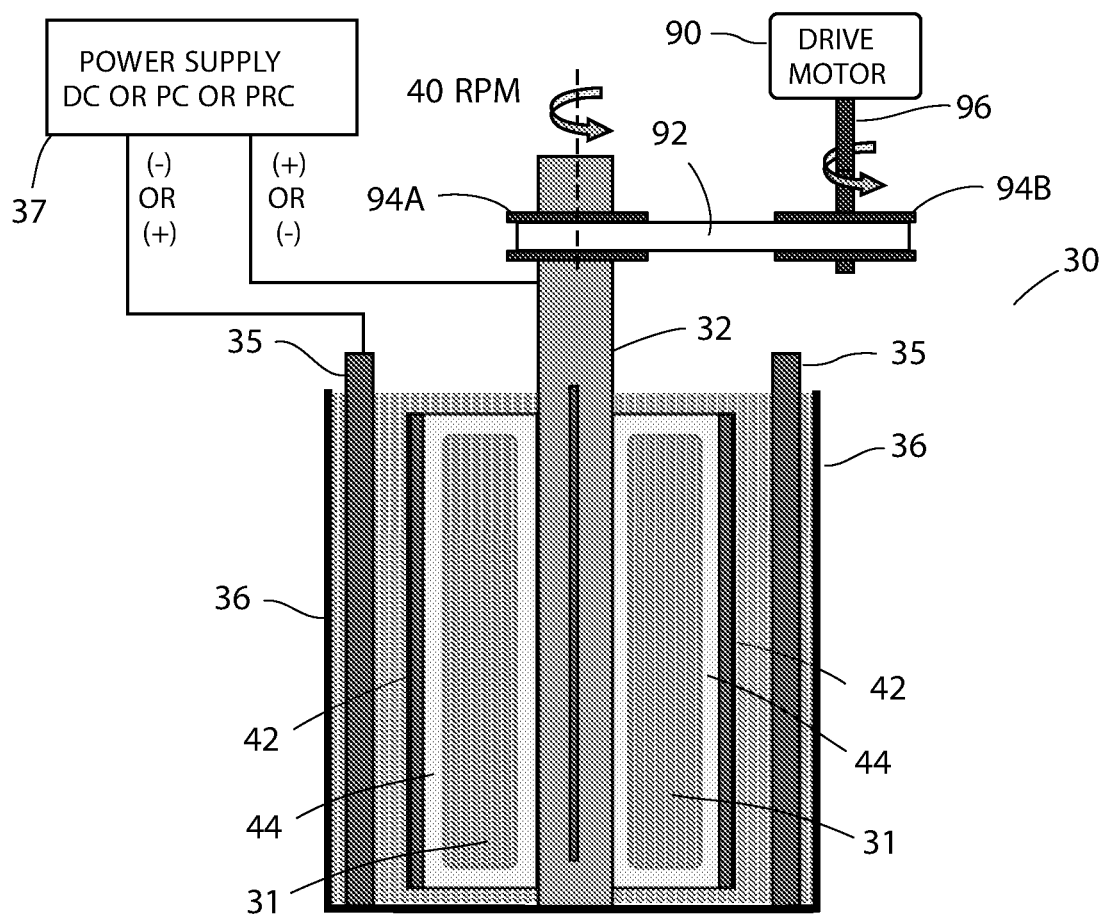
FIGS. 13A and 13B schematically illustrate a cylindrical electrochemical cell with a nanocellulosic suspension with a solid rod electrode with slotted paddles with insulating wipers and a concentric solid electrode.
Figure 13B:
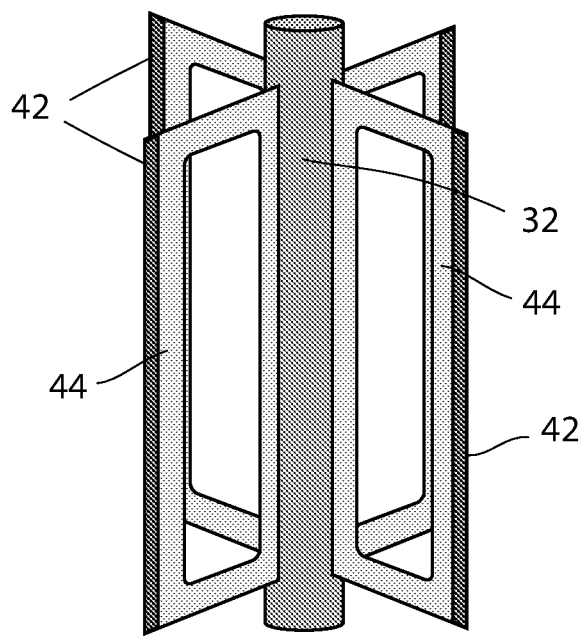

FIG. 13A schematically illustrates a cylindrical electrochemical cell 30 with a solid rod inner electrode 32 with slotted paddles 44 with insulating wipers 42 and a concentric solid outer electrode 35. Power supply 37 is connected to inner electrode 32 and solid outer electrode 35 to provide electric current or voltage across the electrochemical cell 30 containing the nanocellulosic suspension 31. The electrochemical cell 30 is equipped with a rotating mechanism to apply rotation to inner electrode 32. The inner electrode 32 may be rotated at a fixed or variable rotation rate by drive motor 90 and rotating shaft 96 via belt 92 and pulley 94a and pulley 94b. FIG. 13B depicts inner electrode 32 with slotted paddles 44 with insulating wipers 42.

Figure 14A:
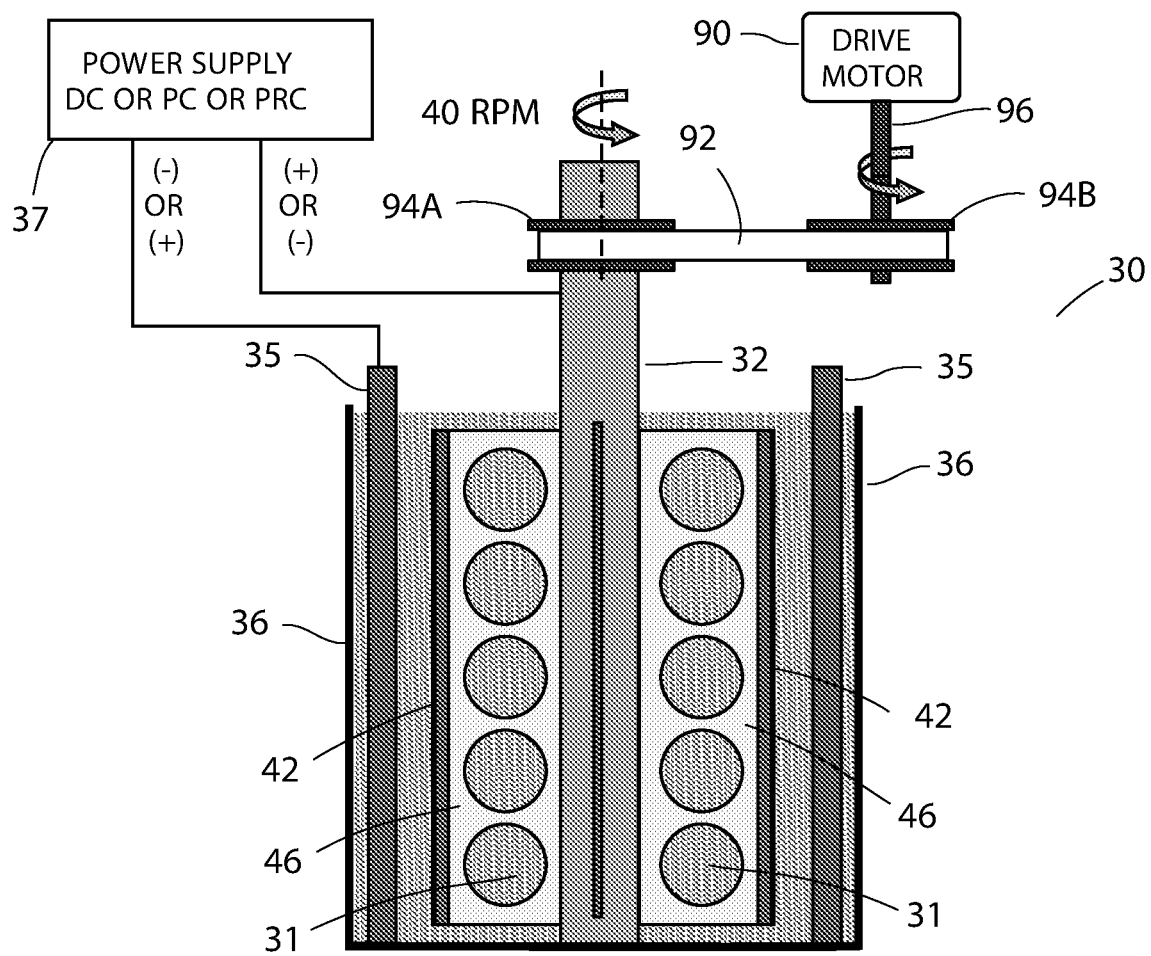
FIGS. 14A and 14B schematically illustrate a cylindrical electrochemical cell with a nanocellulosic suspension with a solid rod electrode with holed paddles with insulating wipers and a concentric solid electrode.
Figure 14B:
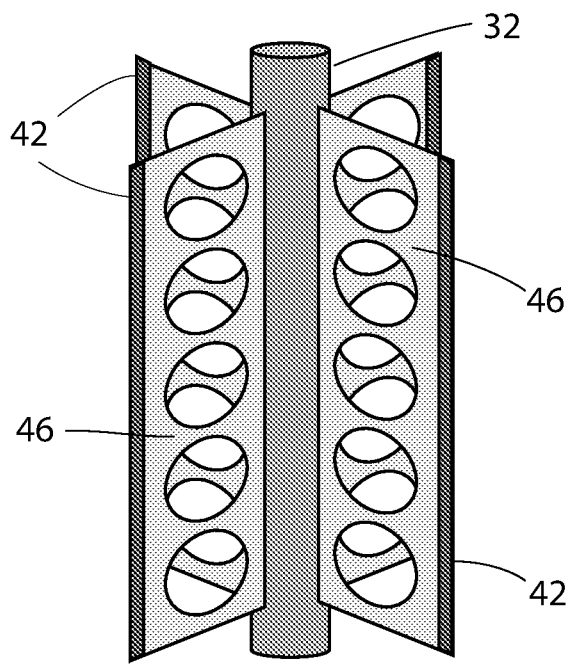

FIG. 14A schematically illustrates a cylindrical electrochemical cell 30 with a solid rod inner electrode 32 with holed paddles 46 with insulating wipers 42 and a concentric solid outer electrode 35. Power supply 37 is connected to inner electrode 32 and solid outer electrode 35 to provide electric current or voltage across the electrochemical cell 30 containing the nanocellulosic suspension 31. The electrochemical cell 30 is equipped with a rotating mechanism to apply rotation to inner electrode 32. The inner electrode 32 may be rotated at a fixed or variable rotation rate by drive motor 90 and rotating shaft 96 via belt 92 and pulley 94a and pulley 94b. FIG. 14B depicts inner electrode 32 with holed paddles 46 with insulating wipers 42.

Figure 15:
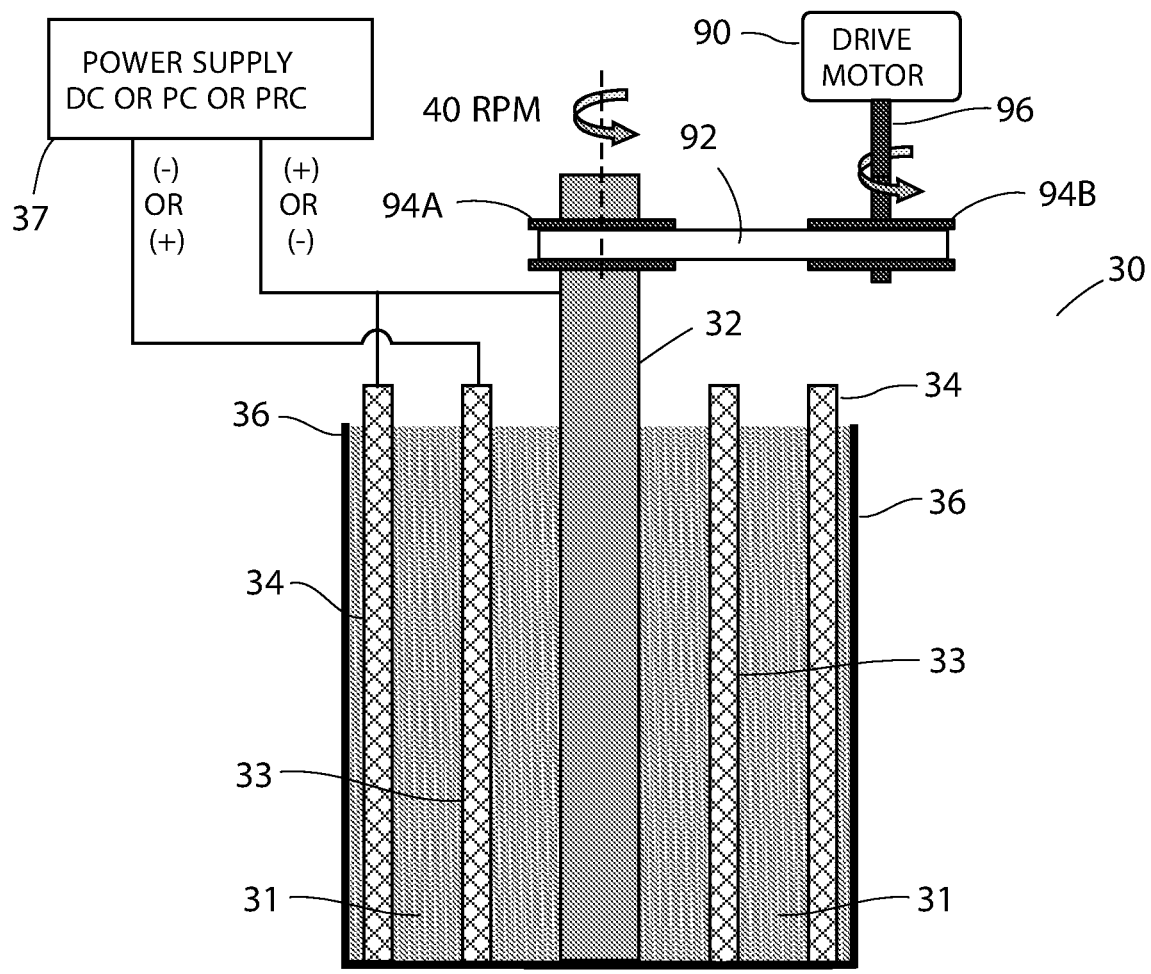
FIG. 15 schematically illustrates a cylindrical electrochemical cell with a nanocellulosic suspension with a solid rod electrode in electrical contact with an outer concentric mesh electrode and another concentric mesh electrode interspersed between the solid rod electrode and the outer concentric mesh electrode.

FIG. 15 schematically illustrates a cylindrical electrochemical cell 30 with a solid inner electrode 32 in electrical contact with a concentric mesh outer electrode 34 and another mesh interspersed electrode 33 between the inner electrode 32 and mesh outer electrode 34. Power supply 37 is connected to inner electrode 32 in electrical contact with outer electrode 34 and interspersed electrode 35 to provide electric current or voltage across the electrochemical cell 30 containing the nanocellulosic suspension 31. The electrochemical cell 30 is equipped with a rotating mechanism to apply rotation to inner electrode 32. The inner electrode 32 may be rotated at a fixed or variable rotation rate by drive motor 90 and rotating shaft 96 via belt 92 and pulley 94a and pulley 94b.

Figure 16:
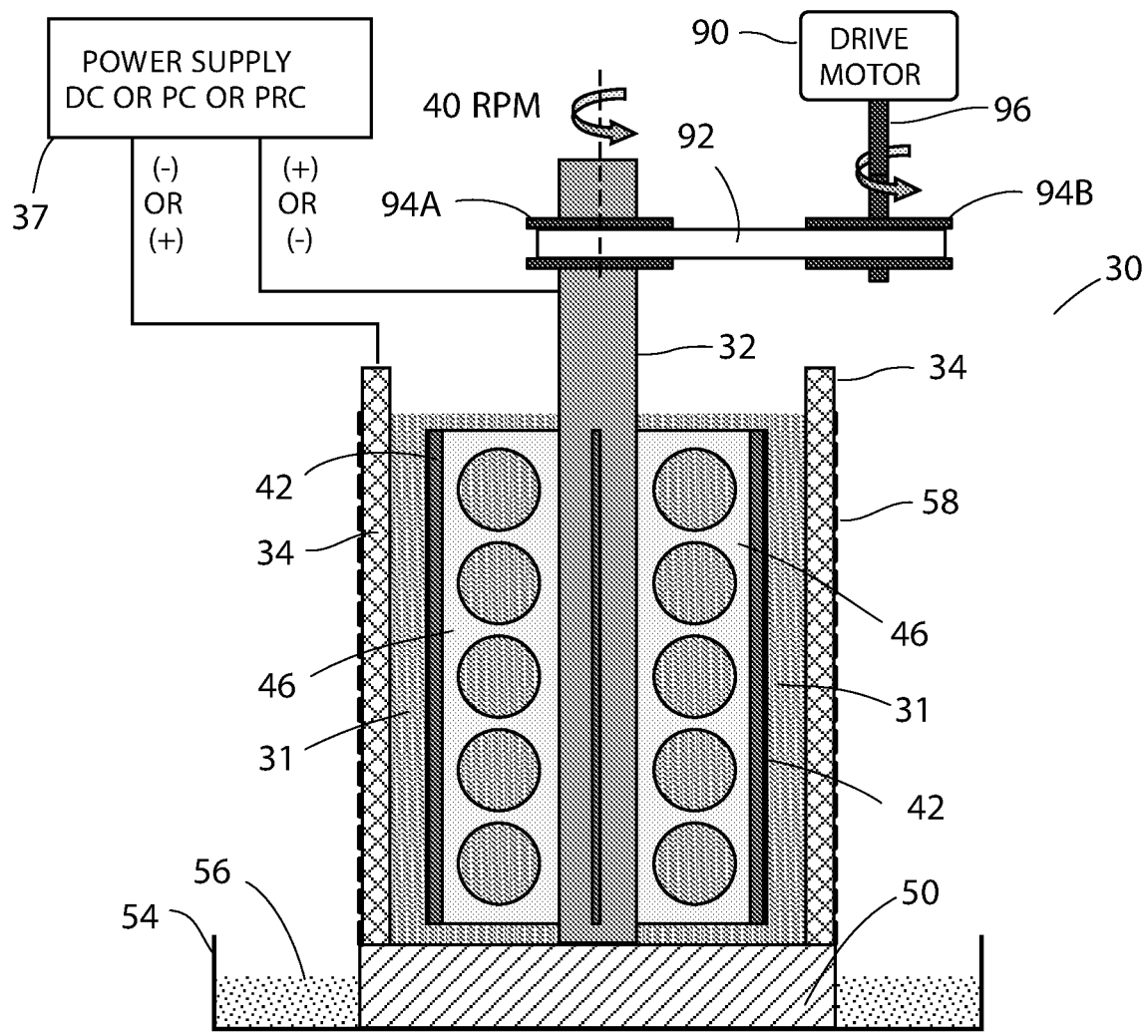
FIG. 16 schematically illustrates a cylindrical electrochemical cell with a nanocellulosic suspension with a solid rod electrode with holed paddles with insulating wipers and a concentric mesh electrode with a concentric microporous separator in a liquid catch basin.

FIG. 16 schematically illustrates a cylindrical electrochemical cell 30 containing a nanocellulosic suspension 31 with a solid rod inner electrode 32 with holed paddles 46 with insulating wipers 42 and a concentric mesh outer electrode 34 with an outer concentric porous separator 58. The porous separator 58 has pores which primarily permits water or low concentration nanocellulosic suspension 56 to pass through. The cylindrical electrochemical cell 30 has a bottom cap 50 and is sitting in liquid catch basin 54. During electrochemical dewatering liquid moves towards the mesh outer electrode 34 by one or more of the various mechanisms discussed herein or another mechanism and passes through the mesh outer electrode 34 and then through porous separator 58 and is collected in liquid catch basin 54 as water or low concentration nanocellulosic suspension 56. The contained liquid 56 consists of water or contains nanocelluslosic material of lower concentration than nanocellulosic suspension 31. Power supply 37 is connected to inner electrode 32 and outer electrode 34 to provide electric current or voltage across the electrochemical cell 30 containing the nanocellulosic suspension 31. The electrochemical cell 30 is equipped with a rotating mechanism to apply rotation to inner electrode 32. The inner electrode 32 may be rotated at a fixed or variable rotation rate by drive motor 90 and rotating shaft 96 via belt 92 and pulley 94a and pulley 94b.

In one embodiment, the mesh outer electrode 34 has larger pore sizes than separator 58 and thus separator 58 prevents cellulosic material from escaping from cell 30.

Figure 17:
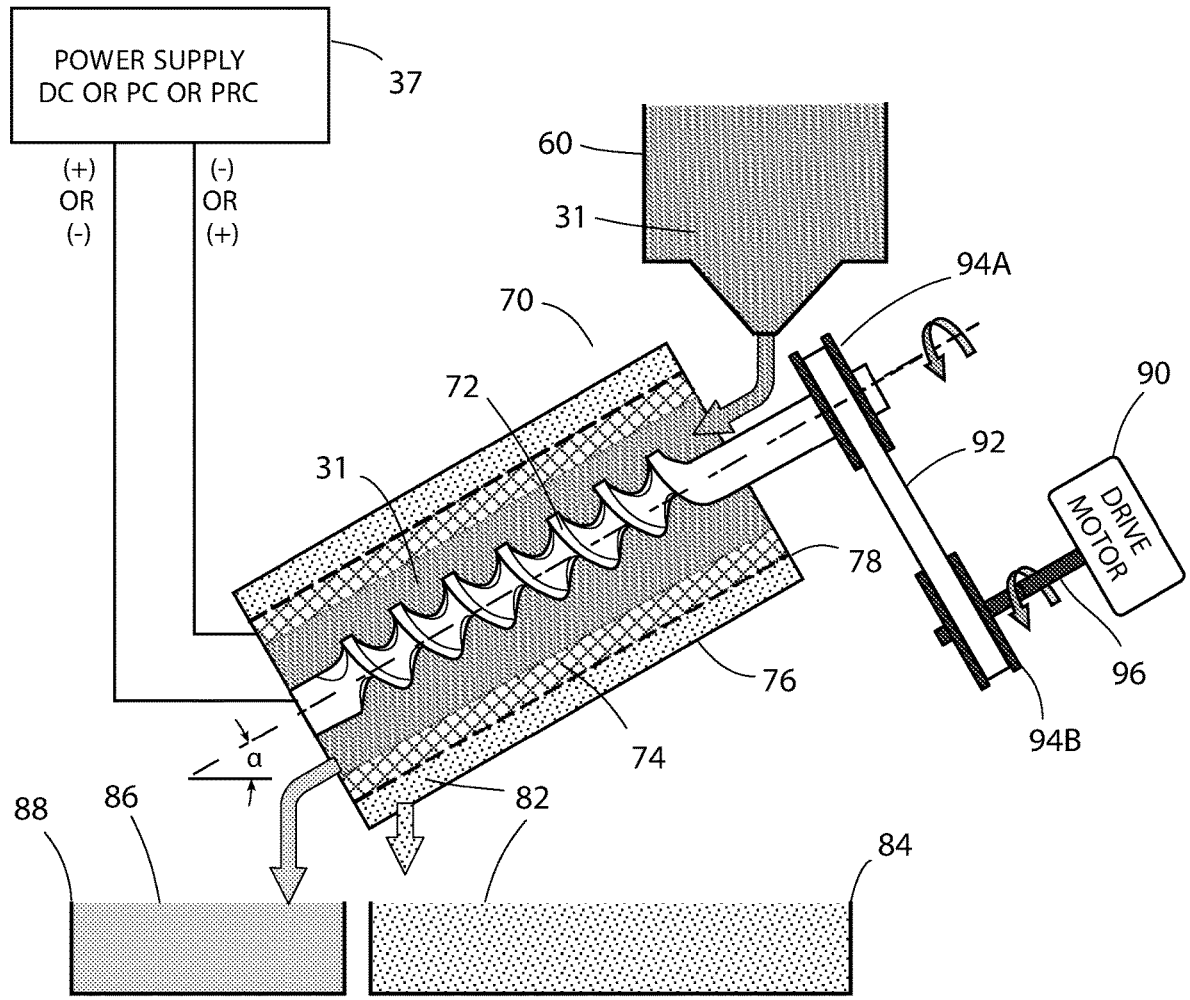
FIG. 17 schematically illustrates a cylindrical tilted electrochemical cell with a nanocellulosic suspension with an inner auger electrode and a tilted outer concentric mesh electrode with an outer concentric microporous separator with a liquid catch basin and a concentrated nanoellulosic suspension catch basin.

FIG. 17 schematically illustrates a cylindrical tilted electrochemical cell 70 with an inner auger electrode 72 and a tilted concentric mesh outer electrode 74 with an outer concentric porous separator 78 within container 76. Auger 72 includes a helical screw blade as shown. The porous separator 58 has pores which primarily permits water or low concentration nanocellulosic suspension to pass through. Nanocellulosic suspension 31 is feed to tilted electrochemical cell 70 from hopper 60. Power supply 37 is connected to inner electrode 72 and mesh outer electrode 74 to provide electric current or voltage across the electrochemical cell 70 containing the nanocellulosic suspension 31. The electrochemical cell 70 is equipped with a rotating mechanism to apply rotation to inner electrode 72. The inner electrode 72 may be rotated at a fixed or variable rotation rate by drive motor 90 and rotating shaft 96 via belt 92 and pulley 94a and pulley 94b. The tilted electrochemical cell 70 may be operated at a titled angle, a ranging from 45-degree to the horizon, 90-degree to the horizon or horizontally. The cylindrical tilted electrochemical cell 70 may be operated in a continuous manner such that water or low concentration nanocellulosic suspension 82 passes through mesh outer electrode 74 and then through porous separator 78 and into liquid catch basin 84 and concentrated nanocellulosic suspension 86 passes into nanocellulosic catch basin 88.

One skilled in the art would readily recognize that in all of the illustrations, the anode may be the inner electrode and the cathode the outer electrode or the anode may be the outer electrode and the anode outer electrode. In addition, the outer electrode may be a solid electrode or a mesh electrode. The relative rotation may be varied during processing in order to maintain a constant viscosity as the solids concentration is increasing.

In the various rotating electrochemical apparatus described herein, the water vapor resulting from Joule heating and/or electrolysis escapes in a gaseous state to the surrounding atmosphere or may be recovered as liquid water in a condenser. In addition, water may be concentrated at the outer mesh cylinder by either or all of 1) the wall slip mechanism resulting from laminar shear flow, or 2) the shear banding mechanism resulting from disrupted laminar flow, or 3) electroosmotic water transport to the outer cathode, or 4) electrophoretic transport of nanocellulosic materials away from an outer cathode and towards an inner anode. The concentrated CNCs or CNFs remain in the electrodewatering apparatus as a batch processed material or the CNCs or CNFs are continuously collected from the extrusion apparatus.

The following examples illustrate various embodiments of the instant invention. All suspensions of CNCs and CNFs were obtained from American Process Inc. The beginning solids contents for the CNCs and CNFs were 3 wt % solids and 7 wt % solids, respectively.

Example I

Figure 18A:
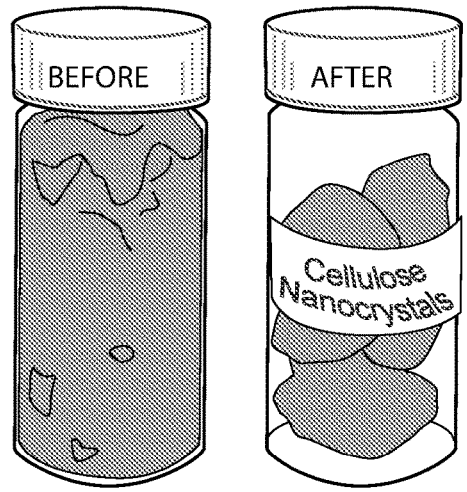
FIGS. 18A and 18B show representative nanocellulosic samples before and after the dewatering trials for (A) CNC and (B) CNF.
Figure 18B:
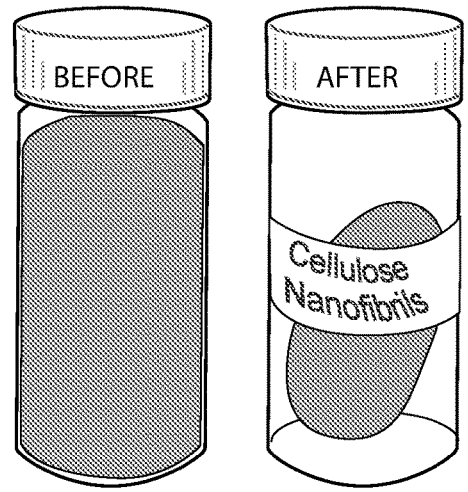
Figure 19A:
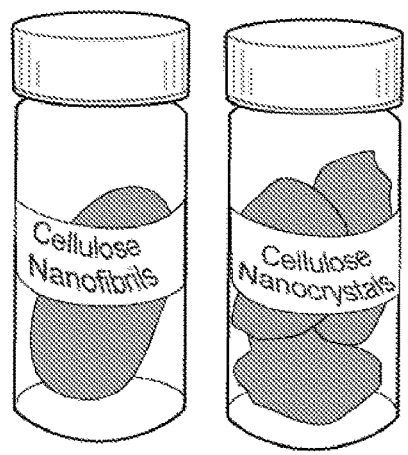
FIGS. 19A and 19B show dewatered CNC and CNF samples (A) before re-dispersion in water and (B) after re-dispersion in water.
Figure 19B:
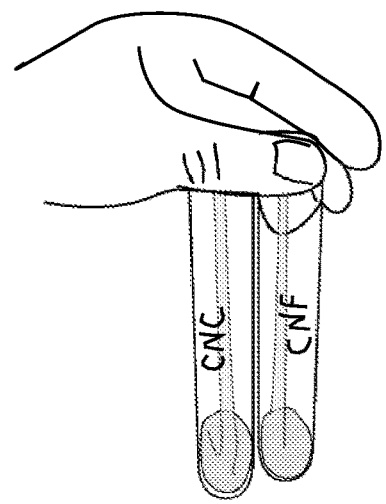
Figure 20:
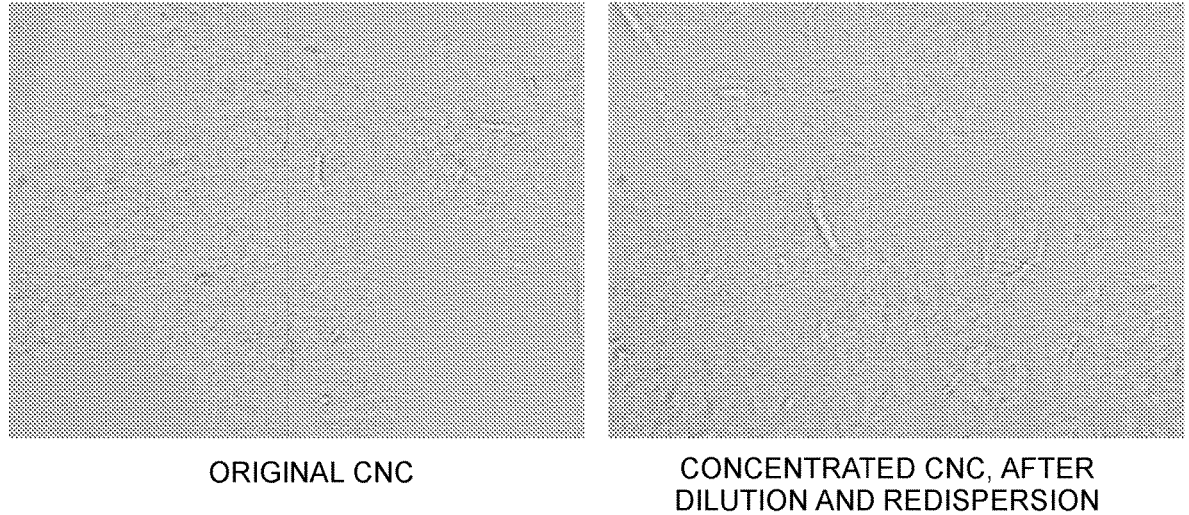
FIG. 20 is optical microscopy of CNCs before and after dewatering/redispersion.
Figure 21:
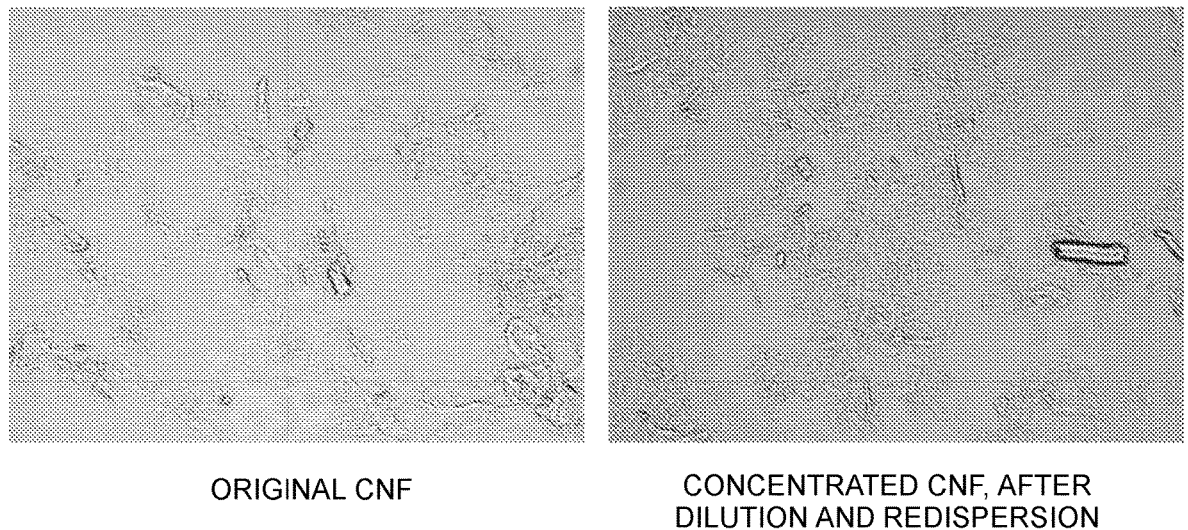
FIG. 21 is optical microscopy of CNFs before and after dewatering/redispersion.

In this example illustrated in FIG. 8 we used a cylindrical electrochemical cell 30 containing a nanocellulosic suspension 31 in container 36 with a mesh mixed metal oxide cylinder as the outer electrode 34 and a solid mixed metal oxide rod as the inner electrode 32 in a concentric arrangement. A power supply 37 capable of delivering direct current or constant voltage, pulse current or pulse voltage, or pulse reverse current or pulse reverse voltage is in electrical contact with the electrochemical cell 30. The outer electrode 34 was polarized as the cathode and the inner electrode 32 was polarized as the anode. The electrochemical cell 30 is equipped with a rotating mechanism to apply rotation to inner electrode 32. The inner electrode 32 was rotated at a fixed 45 rpm by drive motor 90 and rotating shaft 96 via belt 92 and pulley 94a and pulley 94b. The electrochemical cell 30 had a volume of approximately 50 mL and was loaded with approximately 25 g of either CNF or CNC nanocellulosic suspension 31 for each trial. The data in Table I shows that the electrodewatering process increased the solid content of CNF from 3% to ~18 wt % and CNC from 7% to ~15 wt %. Representative picture of CNC from Trial #10 before and after dewatering are shown in FIG. 18A and of CNF before and after dewatering are shown in FIG. 18B. The dewatered samples of CNC (Trial #10) and CNF (Trial #11) were further characterized in terms of their ability to be re-dispersed and via optical analysis. As shown in FIG. 19, the dewatered samples (FIG. 19A) of CNC (Trial #10) and CNF (Trial #11) were easily re-dispersed in water (FIG. 19B) by mixing in water under vortex for two minutes. The dewatered samples of CNC (Trial #10) and CNF (Trial #11) were observed optically at 400X before dewatering of the CNCs (FIG. 20) and CNFs (FIG. 21). As demonstrated in the optical micrographs, the CNCs and CNFs look the same before and after dewatering and re-dispersion in water.

TABLE I

Data acquired using a cylindrical mixed metal oxide mesh outer cathode 32 and a solid mixed metal oxide rod inner anode 34 in a concentric arrangement.

| Trial | Nanocellulose | Applied Potential (V) | Polarization time (min) | $I_{max}$ (A) | $I_{end}$ (A) | $T_{max}$ (° C.) | Stirring | $N_2$ purge | Final solid content (wt. %) |
|---|---|---|---|---|---|---|---|---|---|
| 4 | CNF | 50 | 60 | 2.00 | 0.12 | 80 | Yes | Yes | 18.50 |
| 5 | CNF | 50 | 60 | 2.30 | 0.20 | 90 | Yes | No | 14.80 |
| 6 | CNF | 50 | 60 | 3.30 | 0.12 | 90 | No | Yes | 13.60 |
| 7 | CNF | 50 | 30 | 2.65 | 0.12 | 90 | No | Yes | 13.86 |
| 8 | CNF | 50 | 60 | 2.50 | 0.20 | 92 | No | Yes | 16.90 |
| 9 | CNF | 60 | 15 | 3.50 | 0.09 | 90 | No | Yes | 12.26 |
| 10 | CNC | 90 | 60 | 0.95 | 0.13 | 70 | No | Yes | 15.10 |
| 11 | CNF | 50 | 60 | 3.00 | 0.15 | 90 | No | Yes | 12.00 |

Example II

In this example illustrated in FIG. 11 we used an electrochemical cell 30 containing a nanocellulosic suspension 31 in container 36 with solid mixed metal oxide cylinder as the outer electrode 35 and solid mixed metal oxide rod as the inner electrode 32 with mesh mixed metal oxide mesh paddles 40. A power supply 37 capable of delivering direct current or constant voltage, pulse current or pulse voltage, or pulse reverse current or pulse reverse voltage is in electrical contact with the electrochemical cell 30. The outer electrode 35 was polarized as the cathode and the inner electrode 32 was polarized as the anode. The electrochemical cell 30 is equipped with a rotating mechanism to apply rotation to inner electrode 32. The inner electrode 32 was rotated at a fixed 90 rpm by drive motor 90 and rotating shaft 96 via belt 92 and pulley 94a and pulley 94b. The electrochemical cell 30 had a volume of approximately 150 mL and was loaded with approximately 45 g of either CNF or CNC nanocellulosic suspension 31 for each trial. As shown in Table II, this design concept caused the nanocellulose to agglomerate on the inner surface of the solid mixed metal oxide rod inner electrode 32 which led to a decrease in the electrodewatering performance/final solid content as compared to setup without the impellers.

TABLE II

Data acquired using a solid mixed metal oxide cylinder as the outer cathode 35 and solid mixed metal oxide rod inner anode 32 with mesh mixed metal oxide paddles 40.

| Trial | Nanocellulose | Applied Potential (V) | Polarization time (min) | $I_{max}$ (A) | $I_{end}$ (A) | Stirring | $N_2$ purge | Final solid content (wt. %) |
|---|---|---|---|---|---|---|---|---|
| 12 | CNF | 30 | 90 | 1.50 | 0.92 | Yes | No | 8.55 |
| 13 | CNF | 30 | 120 | 2.00 | 0.50 | Yes | No | 7.31 |
| 14 | CNC | 50 | 60 | 1.00 | 0.50 | Yes | No | 12.67 |
| 15 | CNC | 50 | 60 | 0.90 | 0.65 | Yes | Yes | 13.38 |
| 16 | CNC | 50 | 120 | 1.00 | 0.50 | Yes | No | 10 |

Example III

In this example illustrated in FIG. 12 we used an electrochemical cell 30 containing a nanocellulosic suspension 31 (not shown) in container 36 with a solid mixed metal oxide cylinder as the outer electrode 35 and a solid mixed metal oxide rod as the inner electrode 32 with mixed metal oxide mesh paddles 40 with insulating wipers 42. A power supply 37 capable of delivering direct current or constant voltage, pulse current or pulse voltage, or pulse reverse current or pulse reverse voltage is in electrical contact with the electrochemical cell 30. The outer electrode 35 was polarized as the cathode and the inner electrode 32 was polarized as the anode. The electrochemical cell 30 is equipped with a rotating mechanism to apply rotation to inner electrode 32. The inner electrode 32 was rotated at a fixed 35 rpm by drive motor 90 and rotating shaft 96 via belt 92 and pulley 94a and pulley 94b. The electrochemical cell 30 had a volume of approximately 50 mL and was loaded with approximately 25 g of either CNF or CNC nanocellulosic suspension 31 for each trial. Nitrogen at 1 psi was also used to sparge the nanocellulose suspension during the electrodewatering process. The data in Table III shows that the electrodewatering process increased the solid content of CNF from 3% to ~15% and CNC from 7% to ~20%.

Example IV

In this example illustrated in FIG. 12, we used an electrochemical cell 30 containing a nanocellulosic suspension 31 in container 36 with a solid mixed metal oxide cylinder as the outer electrode 35 and a solid mixed metal oxide rod as the inner electrode 32 with a mesh mixed metal oxide mesh paddles 40 with insulating wipers 42. A power supply 37 capable of delivering direct current or constant voltage, pulse current or pulse voltage, or pulse reverse current or pulse reverse voltage is in electrical contact with the electrochemical cell 30. The electrochemical cell 30 is equipped with a rotating mechanism to apply rotation to inner electrode 32. The inner electrode 32 was rotated at a fixed 40 rpm by drive motor 90 and rotating shaft 96 via belt 92 and pulley 94a and pulley 94b. The electrochemical cell 30 had a volume of approximately 50 mL and was loaded with approximately 25 g of either CNF or CNC nanocellulosic suspension 31 for each trial. In some trials the outer electrode 35 was polarized as the cathode and the inner electrode 32 was polarized as the anode and in other trials the outer electrode 35 was polarized as the anode and the inner electrode 32 was polarized as the cathode. The data in IV shows that the electrodewatering process increased the solid content of CNF from 3% to ~17% and CNC from 7% to ~14%.

TABLE III

Data acquired using a solid mixed metal oxide cylinder as the outer cathode 34 and mixed metal oxide rod inner anode 32 with mixed metal oxide mesh paddles 40 with insulating wipers 42.

| Trial | Nanocellulose | Applied Potential (V) | Polarization time (min) | $I_{max}$ (A) | $I_{end}$ (A) | Stirring | $N_2$ purge | Final solid content (wt. %) |
|---|---|---|---|---|---|---|---|---|
| 17 | CNF | 50 | 60 | 4.00 | 0.10 | Yes | No | 15.00 |
| 18 | CNF | 70 | 30 | 4.00 | 0.05 | Yes | No | 9.00 |
| 19 | CNC | 100 | 30 | 0.50 | 0.05 | Yes | No | 20.00 |
| 20 | CNC | 100 | 30 | 0.50 | 0.00 | No | No | 14.54 |
| 21 | CNC | 100 | 30 | 2.00 | 0.03 | Yes | No | 16.08 |
| 22 | CNF | 50 | 30 | 4.00 | 0.10 | Yes | No | 13.00 |
| 23 | CNF | 50 | 30 | 4.00 | 0.10 | Yes | Yes | 15.00 |

TABLE IV

Data acquired using a solid mixed metal oxide cylinder as the outer electrode 34 and mixed metal oxide rod inner electrode 32 with mixed metal oxide mesh paddles 40 with insulating wipers 42

| Trial | Nano-cellulose | Anode | Cathode | Applied Potential (V) | $I_{avg}$ (A) | Polarization Time (min) | Energy (kW h/kg) | Final Solid Content (wt. %) |
|---|---|---|---|---|---|---|---|---|
| 24 | CNF | Outer cylinder | Inner rod | 20 | 1.04 | 15 | 5 | 5 |
| 25 | CNF | Outer cylinder | Inner rod | 40 | 1.78 | 15 | 18 | 10 |
| 26 | CNF | Outer cylinder | Inner rod | 60 | 1.46 | 15 | 23 | 12 |
| 27 | CNF | Outer cylinder | Inner rod | 80 | 1.11 | 15 | 23 | 12 |
| 28 | CNF | Outer cylinder | Inner rod | 100 | 0.93 | 15 | 24 | 13 |
| 29 | CNF | Outer cylinder | Inner rod | 60 | 0.90 | 30 | 14 | 13 |
| 30 | CNF | Outer cylinder | Inner rod | 80 | 0.86 | 30 | 18 | 15 |
| 31 | CNF | Outer cylinder | Inner rod | 100 | 0.52 | 30 | 14 | 17 |
| 32 | CNF | Inner rod | Outer cylinder | 20 | 1.09 | 15 | 6 | 4 |
| 33 | CNF | Inner rod | Outer cylinder | 40 | 1.74 | 15 | 18 | 8 |
| 34 | CNF | Inner rod | Outer cylinder | 60 | 1.40 | 15 | 22 | 10 |
| 35 | CNF | Inner rod | Outer cylinder | 80 | 1.17 | 15 | 24 | 12 |
| 36 | CNF | Inner rod | Outer cylinder | 100 | 0.80 | 15 | 21 | 12 |
| 37 | CNF | Inner rod | Outer cylinder | 60 | 0.83 | 30 | 13 | 12 |
| 38 | CNF | Inner rod | Outer cylinder | 80 | 0.44 | 30 | 9 | 9 |
| 39 | CNF | Inner rod | Outer cylinder | 100 | 0.37 | 30 | 10 | 11 |
| 40 | CNC | Outer cylinder | Inner rod | 60 | 0.45 | 15 | 3 | 8 |
| 41 | CNC | Outer cylinder | Inner rod | 80 | 0.56 | 15 | 5 | 11 |
| 42 | CNC | Outer cylinder | Inner rod | 100 | 0.58 | 15 | 7 | 11 |
| 43 | CNC | Outer cylinder | Inner rod | 60 | 0.32 | 30 | 2 | 11 |
| 44 | CNC | Outer cylinder | Inner rod | 80 | 0.35 | 30 | 3 | 12 |
| 45 | CNC | Outer cylinder | Inner rod | 100 | 0.32 | 30 | 4 | 12 |
| 46 | CNC | Inner rod | Outer cylinder | 60 | 0.31 | 15 | 2 | 9 |
| 47 | CNC | Inner rod | Outer cylinder | 80 | 0.42 | 15 | 4 | 13 |
| 48 | CNC | Inner rod | Outer cylinder | 100 | 0.58 | 15 | 7 | 13 |
| 49 | CNC | Inner rod | Outer cylinder | 60 | 0.27 | 30 | 2 | 10 |
| 50 | CNC | Inner rod | Outer cylinder | 80 | 0.31 | 30 | 3 | 10 |
| 51 | CNC | Inner rod | Outer cylinder | 100 | 0.34 | 30 | 4 | 14 |

The observed power density for CNF under constant voltage operating conditions are 24 kW h per kg at ~14 wt. % solids.
The observed power density for CNC under constant voltage operating conditions are 7 kW h per kg at ~12 wt. % solids.

Example V

In this example illustrated in FIG. 13 we used an electrochemical cell 30 containing a nanocellulosic suspension 31 in container 36 with solid mixed metal oxide cylinder as the outer electrode 35 and a platinized titanium rod as the inner electrode 32 with platinized titanium slotted paddles 44 with insulating wipers 42. A power supply 37 capable of delivering direct current or constant voltage, pulse current or pulse voltage, or pulse reverse current or pulse reverse voltage is in electrical contact with the electrochemical cell 30. The electrochemical cell 30 is equipped with a rotating mechanism to apply rotation to inner electrode 32. The inner electrode 32 was rotated at a fixed 40 rpm by drive motor 90 and rotating shaft 96 via belt 92 and pulley 94a and pulley 94b. The electrochemical cell 30 had a volume of approximately 50 mL and was loaded with approximately 25 g of either CNF or CNC nanocellulosic suspension 31 for each trial. In some trials the outer electrode 35 was polarized as the cathode and the inner electrode 32 was polarized as the anode and in other trials the outer electrode 35 was polarized as the anode and the inner electrode 32 was polarized as the cathode. The data in V shows that the electrodewatering process increased the solid content of CNF from 3% to ~17% and CNC from 7% to ~16%.

TABLE V

Data acquired using a solid mixed metal oxide cylinder as the outer electrode 34 and platinized titanium rod inner electrode 32 with platinized titanium slotted paddles 40 with insulating wipers 42

| Trial | Nano-cellulose | Anode | Cathode | Applied Potential (V) | $I_{avg}$ (A) | Polarization Time (min) | Energy (kW h/kg) | Final Solid Content (wt. %) |
|---|---|---|---|---|---|---|---|---|
| 52 | CNF | Outer cylinder | Inner rod | 20 | 1.56 | 15 | 8 | 4 |
| 53 | CNF | Outer cylinder | Inner rod | 40 | 2.29 | 15 | 24 | 11 |
| 54 | CNF | Outer cylinder | Inner rod | 60 | 1.42 | 15 | 22 | 11 |
| 55 | CNF | Outer cylinder | Inner rod | 80 | 1.14 | 15 | 24 | 11 |
| 56 | CNF | Outer cylinder | Inner rod | 100 | 0.99 | 15 | 26 | 17 |

TABLE V-continued

Data acquired using a solid mixed metal oxide cylinder as the outer electrode 34 and platinized titanium rod inner electrode 32 with platinized titanium slotted paddles 40 with insulating wipers 42

| Trial | Nano-cellulose | Anode | Cathode | Applied Potential (V) | $I_{avg}$ (A) | Polarization Time (min) | Energy (kW h/kg) | Final Solid Content (wt. %) |
|---|---|---|---|---|---|---|---|---|
| 57 | CNF | Outer cylinder | Inner rod | 60 | 0.90 | 30 | 14 | 11 |
| 58 | CNF | Outer cylinder | Inner rod | 80 | 0.69 | 30 | 14 | 13 |
| 59 | CNF | Outer cylinder | Inner rod | 100 | 0.55 | 30 | 14 | 16 |
| 60 | CNF | Inner rod | Outer cylinder | 20 | 0.78 | 15 | 4 | 5 |
| 61 | CNF | Inner rod | Outer cylinder | 40 | 1.65 | 15 | 17 | 7 |
| 62 | CNF | Inner rod | Outer cylinder | 60 | 1.20 | 15 | 19 | 8 |
| 63 | CNF | Inner rod | Outer cylinder | 80 | 0.94 | 15 | 19 | 8 |
| 64 | CNF | Inner rod | Outer cylinder | 100 | 0.62 | 15 | 16 | 9 |
| 65 | CNF | Inner rod | Outer cylinder | 60 | 0.63 | 30 | 10 | 9 |
| 66 | CNF | Inner rod | Outer cylinder | 80 | 0.34 | 30 | 7 | 9 |
| 67 | CNF | Inner rod | Outer cylinder | 100 | 0.34 | 30 | 9 | 8 |
| 68 | CNC | Outer cylinder | Inner rod | 60 | 0.43 | 15 | 3 | 7 |
| 69 | CNC | Outer cylinder | Inner rod | 80 | 0.57 | 15 | 5 | 10 |
| 70 | CNC | Outer cylinder | Inner rod | 100 | 0.59 | 15 | 7 | 13 |
| 71 | CNC | Outer cylinder | Inner rod | 60 | 0.53 | 30 | 4 | 10 |
| 72 | CNC | Outer cylinder | Inner rod | 80 | 0.51 | 30 | 5 | 15 |
| 73 | CNC | Outer cylinder | Inner rod | 100 | 0.39 | 30 | 4 | 15 |
| 74 | CNC | Inner rod | Outer cylinder | 60 | 0.33 | 15 | 2 | 9 |
| 75 | CNC | Inner rod | Outer cylinder | 80 | 0.45 | 15 | 4 | 11 |
| 76 | CNC | Inner rod | Outer cylinder | 100 | 0.58 | 15 | 7 | 10 |
| 77 | CNC | Inner rod | Outer cylinder | 60 | 0.38 | 30 | 3 | 8 |
| 78 | CNC | Inner rod | Outer cylinder | 80 | 0.38 | 30 | 3 | 9 |
| 79 | CNC | Inner rod | Outer cylinder | 100 | 0.36 | 30 | 4 | 16 |

Example VI

In this example illustrated in FIG. 13 we used an electrochemical cell 30 containing a nanocellulosic suspension 31 in container 36 with a solid platinized titanium cylinder as the outer electrode 35 and a solid platinized titanium rod as the inner electrode 32 with platinized titanium slotted paddles 44 with insulating wipers 42. A power supply 37 capable of delivering direct current or constant voltage, pulse current or pulse voltage, or pulse reverse current or pulse reverse voltage is in electrical contact with the electrochemical cell 30. The electrochemical cell 30 is equipped with a rotating mechanism to apply rotation to inner electrode 32. The inner electrode 32 was rotated at a fixed 40 rpm by drive motor 90 and rotating shaft 96 via belt 92 and pulley 94a and pulley 94b. The electrochemical cell 30 had a volume of approximately 50 mL and was loaded with approximately 25 g of either CNF or CNC nanocellulosic suspension 31 for each trial. In some trials the outer electrode 35 was polarized as the cathode and the inner electrode 32 was polarized as the anode and in other trials the outer electrode 35 was polarized as the anode and the inner electrode 32 was polarized as the cathode. The data in VI shows that the electrodewatering process increased the solid content of CNF from 3% to ~18% and CNC from 7% to ~14%. Operating the system in different polarity did not show any significant correlation for CNC. However, eletrodewatering process while using Pt beaker as anode demonstrated higher final solid content in comparison to using Pt impeller as anode for CNF.

TABLE VI

Data acquired using a solid platinized titanium cylinder as the outer electrode 35 and platinized titanium rod inner electrode 32 with platinized titanium slotted paddles 40 with insulating wipers 42

| Trial | Nano-cellulose | Anode | Cathode | Applied Potential (V) | $I_{avg}$ (A) | Polarization Time (min) | Energy (kW h/kg) | Final Solid Content (wt. %) |
|---|---|---|---|---|---|---|---|---|
| 80 | CNF | Inner rod | Outer cylinder | 20 | 1.06 | 15 | 5 | 4 |
| 81 | CNF | Inner rod | Outer cylinder | 40 | 1.96 | 15 | 20 | 7 |
| 82 | CNF | Inner rod | Outer cylinder | 60 | 1.23 | 15 | 19 | 7 |
| 83 | CNF | Inner rod | Outer cylinder | 80 | 0.81 | 15 | 17 | 10 |
| 84 | CNF | Inner rod | Outer cylinder | 100 | 1.22 | 15 | 32 | 8 |
| 85 | CNF | Outer cylinder | Inner rod | 20 | 1.43 | 15 | 7 | 5 |
| 86 | CNF | Outer cylinder | Inner rod | 40 | 2.11 | 15 | 21 | 9 |
| 87 | CNF | Outer cylinder | Inner rod | 60 | 1.67 | 15 | 26 | 11 |
| 88 | CNF | Outer cylinder | Inner rod | 80 | 1.25 | 15 | 26 | 11 |
| 89 | CNF | Outer cylinder | Inner rod | 100 | 1.07 | 15 | 28 | 14 |
| 90 | CNF | Outer cylinder | Inner rod | 60 | 0.91 | 30 | 14 | 11 |
| 91 | CNF | Outer cylinder | Inner rod | 80 | 0.70 | 30 | 15 | 16 |
| 92 | CNF | Outer cylinder | Inner rod | 100 | 0.60 | 30 | 15 | 18 |
| 93 | CNC | Outer cylinder | Inner rod | 60 | 0.26 | 15 | 2 | 9 |
| 94 | CNC | Outer cylinder | Inner rod | 80 | 0.61 | 15 | 6 | 11 |
| 95 | CNC | Outer cylinder | Inner rod | 100 | 0.64 | 15 | 7 | 14 |
| 96 | CNC | Outer cylinder | Inner rod | 60 | 0.47 | 30 | 3 | 11 |
| 97 | CNC | Outer cylinder | Inner rod | 80 | 0.41 | 30 | 4 | 13 |
| 98 | CNC | Outer cylinder | Inner rod | 100 | 0.37 | 30 | 4 | 13 |

Example VII

In this example illustrated in FIG. 14 we used an electrochemical cell 30 with a nanocellulosic suspension 31 in a container 36 with solid platinized titanium cylinder as the outer electrode 35 and a mixed metal oxide rod as the inner electrode 32 with mixed metal oxide holed paddles 46 with insulating wipers 42. A power supply 37 capable of delivering direct current or constant voltage, pulse current or pulse voltage, or pulse reverse current or pulse reverse voltage is in electrical contact with the electrochemical cell 30. The electrochemical cell 30 is equipped with a rotating mechanism to apply rotation to inner electrode 32. The inner electrode 32 was rotated at a fixed 40 rpm by drive motor 90 and rotating shaft 96 via belt 92 and pulley 94a and pulley 94b. The electrochemical cell 30 had a volume of approximately 50 mL and was loaded with approximately 25 g of either CNF or CNC nanocellulosic suspension 31 for each trial. In some trials the outer electrode 35 was polarized as the cathode and the inner electrode 32 was polarized as the anode and in other trials the outer electrode 35 was polarized as the anode and the inner electrode 32 was polarized as the cathode. The data in VII shows that the electrodewatering process increased the final solid content of CNF from 3% to ~18% and CNC from 7% to ~14%.

TABLE VII

Data acquired using a solid platinized titanium cylinder as the outer electrode 35 and mixed metal oxide rod inner electrode 32 with mixed metal oxide holed paddles 46 with insulating wipers 42

| Trial | Nano-cellulose | Anode | Cathode | Applied Potential (V) | $I_{avg}$ (A) | Polarization Time (min) | Energy (kW h/kg) | Final Solid Content (wt. %) |
|---|---|---|---|---|---|---|---|---|
| 99 | CNF | Inner rod | Outer cylinder | 20 | 1.01 | 15 | 5 | 5 |
| 100 | CNF | Inner rod | Outer cylinder | 40 | 1.98 | 15 | 21 | 8 |

TABLE VII-continued

Data acquired using a solid platinized titanium cylinder as the outer electrode 35 and mixed metal oxide rod inner electrode 32 with mixed metal oxide holed paddles 46 with insulating wipers 42

| Trial | Nano-cellulose | Anode | Cathode | Applied Potential (V) | $I_{avg}$ (A) | Polarization Time (min) | Energy (kW h/kg) | Final Solid Content (wt. %) |
|---|---|---|---|---|---|---|---|---|
| 101 | CNF | Inner rod | Outer cylinder | 60 | 1.25 | 15 | 19 | 8 |
| 102 | CNF | Inner rod | Outer cylinder | 80 | 0.89 | 15 | 18 | 11 |
| 103 | CNF | Inner rod | Outer cylinder | 100 | 0.62 | 15 | 16 | 11 |
| 104 | CNF | Inner rod | Outer cylinder | 60 | 0.59 | 30 | 9 | 10 |
| 105 | CNF | Inner rod | Outer cylinder | 80 | 0.38 | 30 | 8 | 8 |
| 106 | CNF | Inner rod | Outer cylinder | 100 | 0.29 | 30 | 7 | 10 |
| 107 | CNF | Outer cylinder | Inner rod | 20 | 1.72 | 15 | 9 | 5 |
| 108 | CNF | Outer cylinder | Inner rod | 40 | 2.06 | 15 | 21 | 10 |
| 109 | CNF | Outer cylinder | Inner rod | 60 | 1.48 | 15 | 23 | 13 |
| 110 | CNF | Outer cylinder | Inner rod | 80 | 1.04 | 15 | 22 | 11 |
| 111 | CNF | Outer cylinder | Inner rod | 100 | 0.98 | 15 | 25 | 15 |
| 112 | CNF | Outer cylinder | Inner rod | 60 | 0.85 | 30 | 13 | 13 |
| 113 | CNF | Outer cylinder | Inner rod | 80 | 0.67 | 30 | 14 | 13 |
| 114 | CNF | Outer cylinder | Inner rod | 100 | 0.57 | 30 | 15 | 14 |
| 115 | CNC | Inner rod | Outer cylinder | 60 | 0.37 | 15 | 3 | 11 |
| 116 | CNC | Inner rod | Outer cylinder | 80 | 0.54 | 15 | 5 | 12 |
| 117 | CNC | Inner rod | Outer cylinder | 100 | 0.66 | 15 | 8 | 12 |
| 118 | CNC | Inner rod | Outer cylinder | 60 | 0.42 | 30 | 3 | 10 |
| 119 | CNC | Inner rod | Outer cylinder | 80 | 0.32 | 30 | 3 | 13 |
| 120 | CNC | Inner rod | Outer cylinder | 100 | 0.44 | 30 | 5 | 14 |
| 121 | CNC | Outer cylinder | Inner rod | 60 | 0.19 | 15 | 1 | 9 |
| 122 | CNC | Outer cylinder | Inner rod | 80 | 0.56 | 15 | 5 | 10 |
| 123 | CNC | Outer cylinder | Inner rod | 100 | 0.56 | 15 | 6 | 12 |
| 124 | CNC | Outer cylinder | Inner rod | 60 | 0.13 | 30 | 1 | 7 |
| 125 | CNC | Outer cylinder | Inner rod | 80 | 0.27 | 30 | 3 | 11 |
| 126 | CNC | Outer cylinder | Inner rod | 100 | 0.34 | 30 | 4 | 14 |

Example VIII

In this example illustrated in FIG. 15 we used an electrochemical cell 30 with a nanocellulosic suspension 31 in container 36 with a mesh mixed metal oxide cylinder as the outer electrode 34 in electrical contact with a solid mixed metal oxide rod as the inner electrode 32 and a mesh mixed metal oxide cylinder interspersed electrode 33 positioned between outer electrode 34 and inner electrode 32. A power supply 37 capable of delivering direct current or constant voltage, pulse current or pulse voltage, or pulse reverse current or pulse reverse voltage is in electrical contact with the electrochemical cell 30. Relative rotation of the assembly was not employed in these tests. The electrochemical cell 30 had a volume of approximately 50 mL and was loaded with approximately 25 g of either CNF or CNC nanocellulosic suspension 31 for each trial. In some trials the outer electrode 34 in electrical contact with inner electrode 32 was polarized as the cathode and the interspersed electrode 33 was polarized as the anode and in other trials the outer electrode 34 in electrical contact with the inner electrode 32 was polarized as the anode and the interspersed electrode 33 was polarized as the cathode. The data in VIII shows that the electrodewatering process increased the final solid content of CNF from 3% to ~21% and CNC from 7% to ~28%.

TABLE VIII

Data acquired using a mesh mixed meal oxide cylinder as the outer electrode 34 in electrical contact with a mixed metal oxide rod inner electrode 32 and a mixed metal oxide cylinder interspersed electrode 33 positioned between outer electrode 34 and inner electrode 32.

| Trial | Nano-cellulose | Anode | Cathode | Applied Potential (V) | $I_{avg}$ (A) | Polarization Time (min) | Energy (kW h/kg) | Final Solid Content (wt. %) |
|---|---|---|---|---|---|---|---|---|
| 127 | CNF | Inner-Outer electrode | Interspersed electrode | 20 | 1.07 | 15 | 6 | 4 |
| 128 | CNF | Inner-Outer electrode | Interspersed electrode | 40 | 2.17 | 15 | 23 | 10 |
| 129 | CNF | Inner-Outer electrode | Interspersed electrode | 60 | 1.65 | 15 | 26 | 18 |
| 130 | CNF | Inner-Outer electrode | Interspersed electrode | 80 | 1.32 | 15 | 27 | 19 |
| 131 | CNF | Inner-Outer electrode | Interspersed electrode | 100 | 1.09 | 15 | 28 | 19 |

TABLE VIII-continued

Data acquired using a mesh mixed meal oxide cylinder as the outer electrode 34 in electrical contact with a mixed metal oxide rod inner electrode 32 and a mixed metal oxide cylinder interspersed electrode 33 positioned between outer electrode 34 and inner electrode 32.

| Trial | Nano-cellulose | Anode | Cathode | Applied Potential (V) | $I_{avg}$ (A) | Polarization Time (min) | Energy (kW h/kg) | Final Solid Content (wt. %) |
|---|---|---|---|---|---|---|---|---|
| 132 | CNF | Inner-Outer electrode | Interspersed electrode | 60 | 1.07 | 30 | 17 | 14 |
| 133 | CNF | Inner-Outer electrode | Interspersed electrode | 80 | 0.74 | 30 | 15 | 17 |
| 134 | CNF | Inner-Outer electrode | Interspersed electrode | 100 | 0.61 | 30 | 16 | 21 |
| 135 | CNF | Interspersed electrode | Inner-Outer electrode | 20 | 2.93 | 15 | 15 | 5 |
| 136 | CNF | Interspersed electrode | Inner-Outer electrode | 40 | 2.24 | 15 | 23 | 8 |
| 137 | CNF | Interspersed electrode | Inner-Outer electrode | 60 | 1.71 | 15 | 27 | 12 |
| 138 | CNF | Interspersed electrode | Inner-Outer electrode | 80 | 1.40 | 15 | 29 | 12 |
| 139 | CNF | Interspersed electrode | Inner-Outer electrode | 100 | 1.05 | 15 | 27 | 15 |
| 140 | CNF | Interspersed electrode | Inner-Outer electrode | 60 | 1.12 | 30 | 17 | 11 |
| 141 | CNF | Interspersed electrode | Inner-Outer electrode | 80 | 0.88 | 30 | 18 | 14 |
| 142 | CNF | Interspersed electrode | Inner-Outer electrode | 100 | 0.65 | 30 | 17 | 16 |
| 143 | CNC | Inner-Outer electrode | Interspersed electrode | 60 | 1.06 | 15 | 7 | 14 |
| 144 | CNC | Inner-Outer electrode | Interspersed electrode | 80 | 1.10 | 15 | 10 | 17 |
| 145 | CNC | Inner-Outer electrode | Interspersed electrode | 100 | 0.90 | 15 | 10 | 17 |
| 146 | CNC | Inner-Outer electrode | Interspersed electrode | 60 | 0.89 | 30 | 6 | 14 |
| 147 | CNC | Inner-Outer electrode | Interspersed electrode | 80 | 0.65 | 30 | 6 | 16 |
| 148 | CNC | Inner-Outer electrode | Interspersed electrode | 100 | 0.55 | 30 | 6 | 28 |
| 149 | CNC | Interspersed electrode | Inner-Outer electrode | 60 | 1.29 | 15 | 9 | 12 |
| 150 | CNC | Interspersed electrode | Inner-Outer electrode | 80 | 1.15 | 15 | 11 | 20 |
| 151 | CNC | Interspersed electrode | Inner-Outer electrode | 100 | 0.96 | 15 | 11 | 19 |
| 152 | CNC | Interspersed electrode | Inner-Outer electrode | 60 | 0.83 | 30 | 6 | 14 |
| 153 | CNC | Interspersed electrode | Inner-Outer electrode | 80 | 0.54 | 30 | 5 | 14 |
| 154 | CNC | Interspersed electrode | Inner-Outer electrode | 100 | 0.55 | 30 | 6 | 17 |

Example IX

In this example illustrated in FIG. 12 we used an electrochemical cell 30 with a nanocellulosic suspension 31 in container 36 with a solid mixed metal oxide cylinder as the outer electrode 35 and a solid mixed metal oxide rod as the inner electrode 32 with a mesh mixed metal oxide mesh paddles 40 with insulating wipers 42. A power supply 37 capable of delivering direct current or constant voltage, pulse current or pulse voltage, or pulse reverse current or pulse reverse voltage is in electrical contact with the electrochemical cell 30. The electrochemical cell 30 is equipped with a rotating mechanism to apply rotation to inner electrode 32. The inner electrode 32 was rotated at a fixed 40 rpm by drive motor 90 and rotating shaft 96 via belt 92 and pulley 94a and pulley 94b. The electrochemical cell 30 had a volume of approximately 50 mL and was loaded with approximately 25 g of either CNF or CNC nanocellulosic suspension 31 for each trial. The inner electrode 32 was polarized as an anode and the outer electrode 35 was polarized as a cathode. The results for the CNF trials are detailed in IX and the results for the CNC trials are detailed in X. For the CNF experiments under DC polarization, the solids content increased from 3% to 15% and consumed 24 kW-hr/kg. Under various pulsing conditions, the CNF solids content increased from 3% to 10-14% and consumed from 7 to 15 kW-hr/kg. For the CNC experiments under DC polarization, the solids content increased from 7% to 11% and consumed 7 kW-hr/kg. Under the best pulsing conditions, the CNC solids content increased from 7% to 13% and consumed 1 kW-hr/kg.

TABLE IX

Trials conducted on CNF using a solid mixed metal oxide cylinder as the outer electrode 32 and a solid mixed metal oxide rod as the inner electrode 32 with a mesh mixed metal oxide mesh paddles 40 with insulating wipers 42.

| Trial | DC/Pulse process | Applied Potential (V) | Average Potential (V) | Frequency (Hz) | Duty Cycle | Average Current (A) | Time (min) | Energy (kW h/kg) | Final Solid Content (wt. %) |
|---|---|---|---|---|---|---|---|---|---|
| 28 (DC) | DC | 100 | 100 | N/A | 100 | 0.93 | 15 | 24 | 13 |
| 155 | Pulse | 100 | 25 | 10 | 25 | 1.81 | 15 | 12 | 12 |
| 156 | Pulse | 100 | 50 | 10 | 50 | 0.57 | 15 | 7 | 14 |
| 157 | Pulse | 100 | 25 | 1 | 25 | 3.04 | 15 | 15 | 12 |
| 158 | Pulse | 100 | 50 | 1 | 50 | 1.65 | 15 | 13 | 14 |
| 159 | Pulse | 200 | 100 | 10 | 50 | 0.39 | 15 | 10 | 10 |
| 160 | Pulse | 200 | 100 | 1 | 50 | 0.45 | 15 | 12 | 12 |

TABLE X

Trials conducted on CNC using solid mixed metal oxide cylinder as the outer electrode 32 and a solid mixed metal oxide rod as the inner electrode 32 with a mesh mixed metal oxide mesh paddles 40 with insulating wipers 42.

| Trial | DC/Pulse process | Applied Potential (V) | Average Potential (V) | Frequency (Hz) | Duty Cycle | Average Current (A) | Time (min) | Energy (kW h/kg) | Final Solid Content (wt. %) |
|---|---|---|---|---|---|---|---|---|---|
| 42 (DC) | DC | 100 | 100 | N/A | 100 | 0.58 | 15 | 7 | 11 |
| 161 | Pulse | 100 | 25 | 10 | 25 | 0.37 | 15 | 1 | 7 |
| 162 | Pulse | 100 | 50 | 10 | 50 | 0.22 | 15 | 1 | 13 |
| 163 | Pulse | 100 | 75 | 10 | 75 | 0.32 | 15 | 3 | 11 |
| 164 | Pulse | 100 | 25 | 1 | 25 | 0.25 | 15 | 1 | 8 |
| 165 | Pulse | 100 | 50 | 1 | 50 | 0.45 | 15 | 2 | 7 |
| 166 | Pulse | 200 | 100 | 1 | 50 | 0.20 | 15 | 2 | 12 |

Example X

In this example illustrated in FIG. 16 we used an electrochemical cell 30 with a nanocellulosic suspension 31 with a solid mixed metal oxide inner electrode 32 with mixed metal oxide holed paddles 46 with insulating wipers 42 and a concentric mixed metal oxide mesh outer electrode 34 with an outer concentric porous separator 58. The cylindrical electrochemical cell 30 has a non-conducting bottom cap 50 and is sitting in liquid catch basin 54. The porous separator 58 is non-conducting and primarily permits water or low concentration nanocellulosic suspension 31 to pass through and be captured as contained liquid 56 in liquid catch basin 54. A power supply 37 capable of delivering direct current or constant voltage, pulse current or pulse voltage, or pulse reverse current or pulse reverse voltage is in electrical contact with the electrochemical cell 30. The electrochemical cell 30 is equipped with a rotating mechanism to apply rotation to inner electrode 32. The inner electrode 32 was rotated at a fixed 75 rpm by drive motor 90 and rotating shaft 96 via belt 92 and pulley 94a and pulley 94b. The electrochemical cell 30 had a volume of approximately 185 mL and was loaded with approximately 45 g of either CNF or CNC nanocellulosic suspension 31 for each trial. In some trials the outer electrode 34 was polarized as the cathode and the inner electrode 32 was polarized as the anode and in other trials the outer electrode 34 was polarized as the anode and the inner electrode 32 was polarized as the cathode. The data in XI shows that when the cathode was the mixed metal oxide inner electrode 32 the electrodewatering process with a run time of 15 minutes increased the solid content of CNF from 3% to 13.21% with an energy consumption of 17.88 kW-hr/kg. When the cathode was the concentric mixed metal oxide mesh outer electrode 34 the electrodewatering process with a run time of 15 minutes increased the solid content of CNF from 3% to 19.66% with an energy consumption of 11.49 kW-hr/kg. When the cathode was the concentric mixed metal oxide mesh outer electrode 34 the electrodewatering process with a run time of 30 minutes increased the solid content of CNF from 3% to 26.35 to 28.04% with an energy consumption of 17.80 to 22.59 kW-hr/kg. When the cathode was the mixed metal oxide inner electrode 32 the electrodewatering process with a run time of 15 minutes increased the solid content of CNC from 7% to 9.93% with an energy consumption of 5.54 kW-hr/kg. When the cathode was the concentric mixed metal oxide mesh outer electrode 34 the electrodewatering process with a run time of 15 minutes increased the solid content of CNC from 7% to 18.2% with an energy consumption of 2.31 kW-hr/kg. When the cathode was the concentric mixed metal oxide mesh outer electrode 34 the electrodewatering process with a run time of 30 minutes increased the solid content of CNC from 7% to 21.78 to 22.07% with an energy consumption of 2.92 to 2.96 kW-hr/kg.

TABLE XI

Data acquired using a cylinder mixed metal oxide mesh outer electrode 34 with a concentric porous separator 58 and mixed metal oxide rod inner electrode 32 with mixed metal oxide holed paddles 46 with insulating wipers 42.

| Trial | Nano-cellulose | Anode | Cathode | Applied Potential (V) | Time (min) | Final solid content (wt. %) | Energy (Wh) | Energy (kWh/kg) |
|---|---|---|---|---|---|---|---|---|
| 32-II | CNF | Inner rod | Outer cylinder | 100 | 15 | 19.66 | 15.51 | 11.49 |
| 25-II | CNF | Inner rod | Outer cylinder | 100 | 30 | 26.35 | 25.57 | 18.94 |
| 26-II | CNF | Inner rod | Outer cylinder | 100 | 30 | 28.04 | 30.50 | 22.59 |
| 27-II | CNF | Inner rod | Outer cylinder | 90 | 30 | 17.54 | 10.56 | 7.82 |
| 42-II | CNF | Inner rod | Outer cylinder | 100 | 30 | 26.51 | 24.03 | 17.8 |
| 40-II | CNF | Outer cylinder | Inner rod | 100 | 15 | 13.21 | 24.14 | 17.88 |
| 38-II | CNC | Inner rod | Outer cylinder | 100 | 15 | 18.2 | 7.29 | 2.31 |
| 39-II | CNC | Inner rod | Outer cylinder | 100 | 60 | 29.01 | 12.99 | 4.12 |
| 34-II | CNC | Inner rod | Outer cylinder | 100 | 30 | 21.78 | 9.31 | 2.96 |
| 44-II | CNC | Inner rod | Outer cylinder | 100 | 30 | 22.07 | 9.20 | 2.92 |
| 41-II | CNC | Outer cylinder | Inner rod | 100 | 15 | 9.93 | 17.45 | 5.54 |

Example XI

In this example illustrated in FIG. 16 we used an electrochemical cell 30 with a nanocellulosic suspension 31 with a solid mixed metal oxide inner electrode 32 with mixed metal oxide holed paddles 46 with insulating wipers 42 and a concentric mixed metal oxide mesh outer electrode 34 with an outer concentric porous separator 58. The cylindrical electrochemical cell 30 has a non-conducting bottom cap 50 and is sitting in liquid catch basin 54. The porous separator 58 is non-conducting and primarily permits water or low concentration nanocellulosic suspension 31 to pass through and be captured as contained liquid 56 in liquid catch basin 54. A power supply 37 capable of delivering direct current or constant voltage, pulse current or pulse voltage, or pulse reverse current or pulse reverse voltage is in electrical contact with the electrochemical cell 30. The electrochemical cell 30 is equipped with a rotating mechanism to apply rotation to inner electrode 32. The inner electrode 32 was rotated at a fixed 75 rpm by drive motor 90 and rotating shaft 96 via belt 92 and pulley 94a and pulley 94b. The electrochemical cell 30 had a volume of approximately 185 mL and was loaded with approximately 45 g of either CNF or CNC nanocellulosic suspension 31 for each trial. In these trials the outer electrode 34 was polarized as the cathode and the inner electrode 32 was polarized as the anode. The data in XII shows that the electrodewatering process with a run time of 15 minutes with pulse current (voltage) of 100 V at 75% duty cycle and 100 Hz frequency, the solid content of CNF increased from 3% to 20.6% with an energy consumption of 11.7 kW-hr/kg. With a run time of 15 minutes with pulse current (voltage) of 150 V at 75% duty cycle and 100 Hz frequency, the solid content of CNF increased from 3% to 22.5% with an energy consumption of 12.21 kW-hr/kg. With a run time of 30 minutes with pulse current (voltage) of 100 V at 75% duty cycle and frequencies in the range to 1 to 1000 Hz, the solid content of CNF increased from 3% to 21.1 to 34.1% with an energy consumption of 14.01 to 17.35 kW-hr/kg. The electrodewatering process with a run time of 15 minutes with a pulse current (voltage) of 100 V at a 75% duty cycle and 100 Hz frequency, the solid content of CNC from 7% to 19.3% with an energy consumption of 3.67 kW-hr/kg. With a run time of 15 minutes with a pulse current (voltage) of 180 V at a 75% duty cycle and 100 Hz frequency, the solid content of CNC from 7% to 26.9% with an energy consumption of 2.38 kW-hr/kg. With a run time of 30 minutes with a pulse current (voltage) of 100 V at 75% duty cycle and 100 Hz frequency, the solid content of CNC increased from 7% to 24.8% with an energy consumption of 7.69 kW-hr/kg. With a run time of 30 minutes with a pulse current (voltage) of 180 V at 50% duty cycle and 100 Hz frequency, the solid content of CNC increased from 7% to 25.1% with an energy consumption of 2.23 kW-hr/kg.

TABLE XII

Data acquired using a cylinder mixed metal oxide mesh outer electrode 34 with a concentric porous separator 58 and mixed metal oxide rod inner electrode 32 with mixed metal oxide holed paddles 46 with insulating wipers 42.

| Trial | Nano-cellulose | Applied Potential (V) | Average Potential (V) | Time (min) | $T_{ON}$ (ms) | $T_{OFF}$ (ms) | Frequency (Hz) | Duty Cycle (%) | Final solid content (wt. %) | Energy (Wh) | Energy (kWh/kg) |
|---|---|---|---|---|---|---|---|---|---|---|---|
| 45-II | CNF | 100 | 75 | 30 | 750 | 250 | 1 | 75 | 21.1 | 18.91 | 14.01 |
| 46-II | CNF | 100 | 75 | 30 | 75 | 25 | 10 | 75 | 25.7 | 21.75 | 16.11 |
| 47-II | CNF | 100 | 75 | 30 | 7.5 | 2.5 | 100 | 75 | 33.0 | 23.39 | 17.33 |

TABLE XII-continued

Data acquired using a cylinder mixed metal oxide mesh outer electrode 34 with a concentric porous separator 58 and mixed metal oxide rod inner electrode 32 with mixed metal oxide holed paddles 46 with insulating wipers 42.

| Trial | Nano-cellulose | Applied Potential (V) | Average Potential (V) | Time (min) | $T_{ON}$ (ms) | $T_{OFF}$ (ms) | Frequency (Hz) | Duty Cycle (%) | Final solid content (wt. %) | Energy (Wh) | Energy (kWh/kg) |
|---|---|---|---|---|---|---|---|---|---|---|---|
| 48-II | CNF | 100 | 75 | 30 | 0.75 | 0.25 | 1000 | 75 | 34.1 | 22.56 | 16.71 |
| 49-II | CNF | 100 | 50 | 30 | 500 | 500 | 1 | 50 | 20.9 | 12.04 | 8.92 |
| 50-II | CNF | 100 | 50 | 30 | 50 | 50 | 10 | 50 | 22.2 | 13.20 | 9.78 |
| 51-II | CNF | 100 | 50 | 30 | 5 | 5 | 100 | 50 | 26.4 | 13.06 | 9.67 |
| 52-II | CNF | 100 | 50 | 30 | 0.5 | 0.5 | 1000 | 50 | 25.1 | 12.00 | 8.89 |
| 53-II | CNF | 100 | 25 | 30 | 250 | 750 | 1 | 25 | 7.4 | 4.07 | 3.01 |
| 54-II | CNF | 100 | 25 | 30 | 25 | 75 | 10 | 25 | 10.7 | 4.42 | 3.28 |
| 55-II | CNF | 100 | 25 | 30 | 2.5 | 7.5 | 100 | 25 | 10.4 | 3.68 | 2.73 |
| 56-II | CNF | 100 | 25 | 30 | 0.25 | 0.75 | 1000 | 25 | 11.3 | 4.04 | 2.99 |
| 57-II | CNF | 100 | 75 | 40 | 7.5 | 2.5 | 100 | 75 | 43.3 | 27.82 | 20.60 |
| 58-II | CNF | 100 | 50 | 60 | 0.5 | 0.5 | 100 | 50 | 29.3 | 18.84 | 11.73 |
| 59-II | CNF | 100 | 25 | 120 | 25 | 75 | 100 | 25 | 15.2 | 3.77 | 2.79 |
| 60-II | CNF | 100 | 75 | 40 | 7.5 | 2.5 | 100 | 75 | 40.5 | 26.77 | 19.83 |
| 61-II | CNF | 100 | 75 | 15 | 7.5 | 2.5 | 100 | 75 | 20.6 | 15.8 | 11.7 |
| 62-II | CNF | 100 | 75 | 60 | 7.5 | 2.5 | 100 | 75 | 44.9 | 32.53 | 24.1 |
| 63-II | CNC | 100 | 75 | 30 | 7.5 | 2.5 | 100 | 75 | 24.8 | 24.23 | 7.69 |
| 64-II | CNC | 100 | 75 | 40 | 7.5 | 2.5 | 100 | 75 | 30.1 | 31.29 | 9.93 |
| 65-II | CNC | 100 | 75 | 60 | 7.5 | 2.5 | 100 | 75 | 41.5 | 42.58 | 13.52 |
| 66-II | CNC | 100 | 75 | 90 | 7.5 | 2.5 | 100 | 75 | 61.3 | 58.65 | 18.62 |
| 67-II | CNC | 100 | 50 | 60 | 0.5 | 0.5 | 100 | 50 | 22.1 | 23.79 | 7.56 |
| 68-II | CNC | 100 | 25 | 120 | 2.5 | 7.5 | 100 | 25 | 16.8 | 10.24 | 3.25 |
| 69-II | CNC | 100 | 75 | 15 | 7.5 | 2.5 | 100 | 75 | 19.3 | 11.57 | 3.67 |
| 70-II | CNC | 133 | 99.75 | 30 | 7.5 | 2.5 | 100 | 75 | 26.7 | 12.44 | 3.95 |
| 71-II | CNC | 150 | 112.5 | 30 | 7.5 | 2.5 | 100 | 75 | 32.5 | 10.33 | 3.28 |
| 72-II | CNC | 180 | 135 | 30 | 7.5 | 2.5 | 100 | 75 | 40.8 | 11.30 | 3.59 |
| 73-II | CNC | 180 | 135 | 15 | 7.5 | 2.5 | 100 | 75 | 26.9 | 7.49 | 2.38 |
| 74-II | CNC | 180 | 135 | 5 | 7.5 | 2.5 | 100 | 75 | 19.7 | 4.33 | 1.37 |
| 75-II | CNC | 100 | 50 | 30 | 5 | 5 | 100 | 50 | 21.0 | 10.14 | 3.22 |
| 76-II | CNC | 180 | 135 | 30 | 5 | 5 | 100 | 50 | 25.1 | 7.02 | 2.23 |
| 77-II | CNC | 180 | 135 | 30 | 7.5 | 2.5 | 100 | 75 | — | — | — |
| 78-II | CNC | 100 | 100 | 30 | — | — | — | — | — | — | — |
| 79-II | CNC | 180 | 135 | 60 | 7.5 | 2.5 | 100 | 75 | 53.9 | 14.7 | 4.67 |
| 80-II | CNC | 180 | 135 | 90 | 7.5 | 2.5 | 100 | 75 | 68.3 | 16.17 | 5.13 |
| 81-II | CNC | 180 | 135 | 120 | 7.5 | 2.5 | 100 | 75 | 70.0 | 17.43 | 5.53 |
| 82-II | CNF | 180 | 135 | 5 | 7.5 | 2.5 | 100 | 75 | 19.2 | 11.49 | 8.52 |
| 83-II | CNF | 180 | 135 | 15 | 7.5 | 2.5 | 100 | 75 | | Charring* | |
| 84-II | CNF | 150 | 112.5 | 15 | 7.5 | 2.5 | 100 | 75 | 22.5 | 16.48 | 12.21 |
| 85-II | CNF | 150 | 112.5 | 30 | 7.5 | 2.5 | 100 | 75 | | Charring* | |
| 86-II | CNF | 133 | 99.75 | 40 | 7.5 | 2.5 | 100 | 75 | | Charring* | |

Example XII

Selected samples were selected from the previous studies to access the ability of the electrodewatered samples to be re-dispersed. The re-dispersion was conducted using a vortex mixer with a 0.2 wt % sample of electrodewatered nanocellulosic material in water for 10 minutes. The results are presented in Table XIII For CNC suspensions of approximately 26 to 30 wt %, the samples were able to be dispersed. For CNF suspensions of approximately 18 to 23 wt %, the samples were able to be dispersed. These are approximately the same limits reported for more energy intensive dewatering techniques.

TABLE XIII

Re-dispersion results.

| Nanocellulose | Trial | Solids content (wt. %) | Redispersable within 10 min under vortex | Hornification observed |
|---|---|---|---|---|
| CNC | 38-II | 18.3 | Yes | No |
| CNC | 67-II | 21.7 | Yes | No |
| CNC | 70-II | 26.0 | Yes | No |
| CNC | 39-II | 29.0 | Not quite | Some small agglomerates |
| CNC | 66-II | 61.3 | No | Yes |
| CNC | 144 | 17.0 | Yes | No |
| CNF | 27-II | 18.4 | Yes | No |
| CNF | 84-II | 23.3 | Not quite | Some small agglomerates |
| CNF | 46-II | 26.0 | No | Yes |
| CNF | 58-II | 29.0 | No | Yes |
| CNF | 62-II | 44.9 | No | Yes |
| CNF | 130 | 19.0 | Yes | No |

Although the figures illustrate that the central inner electrode 32 is rotating, the instant invention is not bound by which electrode is in rotation as either the inner electrode 32 or outer electrode 34 may be rotating or both inner electrode 32 and outer electrode 34 may be rotating. Furthermore, the figures illustrate the inner electrode 32 as the anode (positive polarity) and the outer electrode 34 as the cathode (negative polarity), however in some embodiments the inner electrode 32 may be the cathode (negative polarity) and the outer electrode 34 may be the anode (positive polarity). By the relative rotation of inner electrode 32 and outer electrode 34 the concentration of the nanocellulosic material near the rotating electrode surfaces decreases and the water may pass a mesh outer electrode 34 into container 36. This transport of water to the mesh outer 34 is further enhanced by electroosmosis transport of water to the mesh outer cathode 34. In addition, this transport of water to the mesh outer 34 is further enhanced by centrifugal forces due to the relative rotation of the inner electrode 32 and outer electrode 34 causing the nanocellulosic material suspension to rotate. In addition, the nanocellulosic material is concentrated at the inner electrode 32 surface by electrophoretic movement. Additionally, as an electric current is applied to cylindrical electrochemical cell 30 though the nanonocellulosic material suspension resulting in Joule heating, water is removed from the nanocellulosic suspension by evaporation. In addition, due to the application of an electric current to the cylindrical electrochemical cell 30 water is removed by the electrolysis reactions at the mesh outer cathode 34 and inner anode 32.

One aspect of a preferred embodiment is to provide a process and apparatus for dewatering aqueous suspensions of nanocellulosic materials, such as cellulosic nanocrystals (CNCs), cellulosic nanofibers (CNFs) and mixtures thereof in an improved manner with a reduced cost.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A dewatering method for non-Newtonian nanocellulosic fluids including cellulosic nanocrystals (CNCs) and/or cellulosic nanofibers (CNFs), free water, and immobilized water bound to the CNCs and/or the CNFs by hydrogen bonds, the method comprising:
    feeding the non-Newtonian fluids into a chamber with an inner electrode including an auger with a helical screw blade and an outer mesh electrode about the inner electrode;
    rotating at least one electrode relative to the other to produce wall slip and shear banding lowering the viscosity of the non-Newtonian fluids resulting in regions of low nanocellulosic material concentrations to enhance the separation of water from the nanocellulosic suspension; and
    simultaneously applying a direct current and/or pulse and/or reverse pulse waveform across the inner electrode and the outer mesh electrode urging water to migrate towards the outer mesh electrode for extraction therethrough and further urging the CNCs and/or CNFs towards the inner electrode for transport by the helical screw blade out of the chamber for collection.

2. The method of claim 1 further including a separator about the outer mesh electrode.

3. The method of claim 1 in which the dewatered fluids are 12-30 wt % solids.

* * * * *

UNITED STATES PATENT AND TRADEMARK OFFICE
CERTIFICATE OF CORRECTION

| | | |
|---|---|---|
| PATENT NO. | : 12,091,333 B2 | Page 1 of 1 |
| APPLICATION NO. | : 18/068895 | |
| DATED | : September 17, 2024 | |
| INVENTOR(S) | : Timothy D. Hall et al. | |

It is certified that error appears in the above-identified patent and that said Letters Patent is hereby corrected as shown below:

On the Title Page

Item (72) Line 3 of the Inventor's section should now read as follows:
--OH (US); Stephen T. Snyder,--

Signed and Sealed this
Twenty-fifth Day of March, 2025

Coke Morgan Stewart
*Acting Director of the United States Patent and Trademark Office*